United States Patent
Miyajima

(10) Patent No.: US 9,708,499 B2
(45) Date of Patent: Jul. 18, 2017

(54) INK COMPOSITION FOR INK JET

(71) Applicant: Seiko Epson Corporation, Tokyo (JP)

(72) Inventor: Yoshitaka Miyajima, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/082,275

(22) Filed: Mar. 28, 2016

(65) Prior Publication Data

US 2016/0333211 A1    Nov. 17, 2016

(30) Foreign Application Priority Data

May 15, 2015  (JP) ................................. 2015-099998
Aug. 25, 2015  (JP) ................................. 2015-165551

(51) Int. Cl.
| | | |
|---|---|---|
| *C09D 11/38* | (2014.01) | |
| *C09D 11/10* | (2014.01) | |
| *C09D 11/54* | (2014.01) | |
| *C09D 11/30* | (2014.01) | |
| *C09D 11/107* | (2014.01) | |

(52) U.S. Cl.
CPC ............ *C09D 11/54* (2013.01); *C09D 11/107* (2013.01); *C09D 11/30* (2013.01)

(58) Field of Classification Search
None
See application file for complete search history.

(56) References Cited

U.S. PATENT DOCUMENTS

| | | | |
|---|---|---|---|
| 6,048,388 A | * | 4/2000 | Schwarz ............... C09D 11/38 106/31.27 |
| 2003/0199613 A1 | | 10/2003 | Ninomiya et al. |
| 2006/0139426 A1 | * | 6/2006 | Doi ....................... C09D 11/40 347/100 |
| 2006/0209149 A1 | | 9/2006 | Hasegawa et al. |
| 2009/0008031 A1 | * | 1/2009 | Gould ..................... C09K 9/02 156/275.5 |
| 2009/0242854 A1 | * | 10/2009 | Li .......................... C09D 11/101 252/519.33 |
| 2012/0101184 A1 | * | 4/2012 | Wang ................... C07D 233/58 522/167 |
| 2013/0005851 A1 | * | 1/2013 | Cai ....................... C09D 11/324 523/122 |
| 2014/0065381 A1 | * | 3/2014 | De Saint Romain .. C09D 11/30 428/196 |

FOREIGN PATENT DOCUMENTS

| | | |
|---|---|---|
| JP | 03-064376 A | 3/1991 |
| JP | 08-073785 A | 3/1996 |
| JP | 2002-030243 A | 1/2002 |
| JP | 2003-313475 A | 11/2003 |
| JP | 5116002 B2 | 1/2013 |

OTHER PUBLICATIONS

Machine translation of CN 103436073 A (Dec. 11, 2013).*
Cola Solv IES & OES (Sep. 26, 2011).*

* cited by examiner

*Primary Examiner* — Vu A Nguyen
(74) *Attorney, Agent, or Firm* — Harness, Dickey & Pierce, P.L.C.

(57) ABSTRACT

The ink composition for an ink jet according to the invention includes a pigment or a disperse dye as a coloring material and an ionic liquid; and the content of the ionic liquid therein is 0.05% by mass to 5% by mass.

9 Claims, No Drawings

INK COMPOSITION FOR INK JET

BACKGROUND

1. Technical Field

The present invention relates to an ink composition for an ink jet.

2. Related Art

An ink jet recording method is a method in which printing is performed by discharging small droplets of ink from fine nozzles and by causing the small droplets of ink to adhere to a recording medium such as paper. A feature of the method is that high-resolution high-quality images can be printed at high speed using a relatively inexpensive apparatus.

A typical ink used in ink jet recording is a dye ink, a pigment ink, or the like. In an ink including a coloring material such as a pigment or a disperse dye, it is important that these coloring materials are stably dispersed on a dispersion medium, but such dispersion is not always easy. In particular, in a case where the temperature conditions with respect to the dispersion system of a coloring material change, the adsorption equilibrium of the coloring material of the dispersant is disturbed, which affects the interactions between the coloring material particles, and thus, with regard to long-term preservation, changes in physical properties occur and/or aggregated contaminations are generated. Such changes in physical properties (in particular, changes in viscosity) in an ink for ink jet printers and/or changes in the characteristics of the head cause clogging of discharge nozzles, and thus, printing is not properly performed in some cases.

To solve such problems, it is necessary to suppress changes in physical properties and/or the generation of aggregated contaminations in the ink by improving dispersion stability or solubility and compatibility of the ink materials, optimizing the ink composition, and the like (for example, refer to Japanese Patent No. 5116002). In addition, attempts have been made to use an ink after removing the collected contaminations by heating the ink in advance (for example, refer to JP-A-3-64376, JP-A-8-73785, JPA-2002-30243, and JP-A-2003-313475).

In general, it is difficult to completely remove the impurities in a production (synthesis) step of a coloring material such as a pigment or a disperse dye, and even in the case of products with a high purity grade, a certain amount of impurities is typically included in a coloring material. As exemplary examples of such impurities, there are coloring matter analogues that are structurally similar to the coloring matter molecules constituting the coloring material. That is, it is difficult to separate structurally similar molecules that during purification of the coloring material. In a case where such a coloring material is dispersed in a dispersion medium, the impurities are eluted into the dispersion medium and are precipitated. Moreover, this phenomenon can occur over time. In the case of a coloring material in which coloring matter molecules have a planar structure, it is thought that the coloring material is dispersed in a dispersion medium in a state in which the coloring matter molecules are stacked with each other, and from such a stacked state, coloring matter analogues are slowly eluted into a dispersion medium. Since the planar structural analogue of the coloring matter molecules exhibits dissolution characteristics and dispersion characteristics different from those of the original coloring matter molecules, in a case where the structural analogue is eluted into a solvent, precipitates different from those of coloring material are generated, these become contaminations, and the contaminations are precipitated or dispersed in the solvent, or float on the solvent.

In addition, the ink in which such a coloring material is dispersed contains a resin for fixing the coloring material onto a recording medium. For example, by being contained in a form of an emulsion, the resin becomes a stable dispersion or solution in the ink. However, in particular, in the ink for industrial applications, there is a case where a large amount of a fixing resin emulsion is included, but with the increase in the content of the fixing resin, there is a growing concern that contaminations derived from the fixing resin will be generated.

Furthermore, in printers for industrial applications, because the operating time is relatively long, the time in which the ink and the members in the printer are in contact with each other inevitably increases. As a result, for example, impurities such as fatty acids (salts) are eluted from the members of the printer into the ink and are precipitated, these become contaminations, and thus, the possibility of causing defects is higher than in the case of the general-purpose printers in the related art.

SUMMARY

An advantage of some aspects of the invention is to provide an ink composition for an ink jet which suppresses generation of contaminations derived from the coloring material or the members and has excellent preservation stability or discharge stability. In addition to this, an advantage of some aspects of the invention is that an ink composition is provided for an ink jet which has excellent print quality.

The invention can be realized in the following aspects or application examples.

Application Example 1

According to an aspect of the invention, there is provided an ink composition for an ink jet including a pigment or a disperse dye as a coloring material and an ionic liquid in which the content of the ionic liquid is 0.05% by mass to 5% by mass.

According to the ink composition for an ink jet according to Application Example 1, contaminations derived from the coloring material or the members are dissolved by the ionic liquid, and thus, generation of contaminations is suppressed and preservation stability is improved. As a result of suppressing generation of contaminations in the ink flow path, the reliability of discharge stability from a recording head of an ink jet recording apparatus and clogging recoverability is improved.

Application Example 2

In the ink composition for an ink jet according to Application Example 1, the ionic liquid may be a liquid ionic compound at a temperature lower than 150° C.

Application Example 3

In the ink composition for an ink jet according to Application Example 1 or 2, the content ratio of the ionic liquid to the coloring material (ionic liquid content/coloring material content) may be 0.01 to 1.

According to the ink composition for an ink jet according to Application Example 3, the balance of the content ratio of the ionic liquid and the coloring material is improved, and thus, it is possible to effectively suppress contaminations, in particular, those derived from the coloring material.

Application Example 4

In the ink composition for an ink jet according to any one of Application Examples 1 to 3, a resin having a glass transition temperature of 0° C. or lower may be further included.

In a case where a resin having a glass transition temperature of 0° C. or lower is included, contaminations are likely to result due to intertwining of the hydrophobic portions of the resin in an ink. However, according to the ink composition for an ink jet according to Application Example 4, contaminations resulting due to intertwining of the resin are dissolved by an ionic liquid, and thus, generation of contaminations is suppressed and preservation stability is improved.

Application Example 5

In the ink composition for an ink jet according to Application Example 4, the content ratio of the ionic liquid to the resin (ionic liquid content/resin content) may be 0.01 to 5.

According to the ink composition for an ink jet according to Application Example 5, the balance of the content ratio of the ionic liquid and the resin is improved, and thus, it is possible to effectively suppress generation of contaminations, in particular, those derived from intertwining of the resin.

Application Example 6

In the ink composition for an ink jet according to any one of Application Examples 1 to 5, two or more types of ionic liquids may be further included as the ionic liquid.

According to the ink composition for an ink jet according to Application Example 6, by including two or more different types of ionic liquids in accordance with the characteristics of contaminations derived from a coloring material or members, a resin, or the like, it is possible to effectively suppress generation of contaminations.

Application Example 7

In the ink composition for an ink jet according to any one of Application Examples 1 to 6, water may be further included as a solvent, and the ionic liquid may be water-soluble.

Application Example 8

In the ink composition for an ink jet according to any one of Application Examples 1 to 6, an organic solvent may be further included as a solvent, and the ionic liquid may be water-insoluble.

Application Example 9

In the ink composition for an ink jet according to any one of Application Examples 1 to 6, a polymerizable compound may be further included, and the ionic liquid may be water-insoluble.

According to the ink composition for an ink jet according to Application Examples 7 to 9, by changing the type of ionic liquid depending on the type of the ink composition, it is possible to effectively suppress generation of contaminations derived from a coloring material or members, a resin, or the like.

DESCRIPTION OF EXEMPLARY EMBODIMENTS

Hereinafter, the preferred embodiment of the invention will be described. The embodiment described below describes one example of the invention. In addition, the invention is not limited to the following embodiment and may include various modifications performed within the scope not departing from the gist of the invention.

1. Ink Composition for Ink Jet

The ink composition for an ink jet according to the invention includes a pigment or a disperse dye as a coloring material and an ionic liquid; and the content of the ionic liquid therein is 0.05% by mass to 5% by mass. The ink composition for an ink jet according to the invention necessarily includes a pigment or a disperse dye as a coloring material and an ionic liquid, and according to the additional included components, the ink composition for an ink jet according to the invention can be broadly classified as an aqueous ink composition, a solvent-based ink composition, and a photocurable ink composition. Hereinafter, the components included in each of an aqueous ink composition, a solvent-based ink composition, and a photocurable ink composition will be described in this order.

1.1. Aqueous Ink Composition

The "aqueous ink composition" in the present specification refers to an ink composition containing equal to or greater than 30% by mass of water with respect to the total mass (100% by mass) of the ink composition.

1.1.1. Coloring Material

The aqueous ink composition according to the embodiment contains a pigment or a disperse dye as a coloring material. In the ink composition for an ink jet according to the embodiment, the cause of the resultant contaminations described above is considered to be the same as for a pigment and a disperse dye.

1.1.1.1. Pigment

Although the type of pigment is not particularly limited, in a case where a pigment including a molecule having a planar skeleton is used, the effects of suppressing contaminations derived from the pigment increase. In the case of a pigment including a molecule having a planar skeleton, it is thought that the pigment is dispersed in a solvent in a state in which the coloring matter molecules are stacked with each other, and from such a stacked state, coloring matter analogues are slowly eluted into a solvent. Since such a planar structural analogue of the coloring matter molecules exhibits dissolution characteristics and dispersion characteristics different from those of the original coloring matter molecules, in a case where the structural analogue is eluted into a solvent, precipitates different from those of a pigment are generated, these become contaminations, and the contaminations are precipitated or dispersed in the solvent, or float on the solvent. Since the ionic liquid included in the aqueous ink composition according to the embodiment has a good ability for dissolving the planar structural analogue of the coloring matter molecules, it is possible to effectively suppress generation of contaminations derived from the pigment.

The "planar skeleton" described here, which is not limited to the following, refers to, for example, a skeleton having a planar conjugated system or a skeleton in which planarity is maintained by a conjugated system, such as a condensed polycyclic skeleton such as naphthalene, anthracene, phenanthrene, or pyrene formed by planar condensation of benzene, a heteropolycyclic skeleton including a heterocyclic ring of nitrogen, oxygen, sulfur, or phosphorus in a polycyclic skeleton such as porphyrin, or a ring structure skeleton linked by a bond in which bicyclic systems such as azobenzene and bicyclopentadienylidene maintain planarity.

Therefore, "pigment having a planar skeleton" means that coloring matter molecules constituting a pigment may have the skeleton described above, but not all of the coloring matter molecules are required to have such a skeleton. Thus, for example, even in a case where one coloring matter molecule has a plurality of planar skeletons, the coloring matter molecule has planar skeletons. Furthermore, not all of the coloring matter molecules of a coloring material are required to be planar, and for example, by disposing various substituents or the like in a planar skeleton, it is not necessary for the substituents to be in the plane of the planar skeleton. In addition, for example, a plurality of planar skeletons may not be in the same plane as each other, or the planes of the planar skeletons may not be parallel to each other.

As such a pigment, an organic coloring matter molecule which has a conjugated system and exhibits color as the result of the conjugated system absorbing light energy is exemplified. Examples of the pigment formed of the organic coloring matter molecules include an azo-based pigment, a phthalocyanine-based pigment, a condensed polycyclic pigment, a nitro-based pigment, a nitroso-based pigment, a quinacridone-based pigment, a quinacridonequinone-based pigment, a dioxazine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perynone-based pigment, a quinophthalone-based pigment, an anthraquinone-based pigment, a thioindigo-based pigment, a benzimidazolone-based pigment, an isoindolinone-based pigment, and an azomethine-based pigment.

Although the content of the pigment in the aqueous ink composition according to the embodiment is not particularly limited, the content is preferably 1% by mass to 20% by mass, more preferably 2% by mass to 10% by mass, and particularly preferably 3% by mass to 8% by mass, with respect to the total mass (100% by mass) of the aqueous ink composition.

In the aqueous ink composition according to the embodiment, a resin-dispersed pigment or a self-dispersing pigment obtained by dispersing the pigment in a resin is preferably used from the viewpoint of uniformly and stably dispersing the pigment.

Resin-Dispersed Pigment

Examples of the resin dispersant used in the resin-dispersed pigment include polyvinyl alcohols, polyacrylic acid, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-methylstyrene-acrylic acid copolymer, a styrene-methylstyrene-acrylic acid-acrylic acid ester copolymer, a styrene-maleic acid copolymer, a styrene-maleic anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, a vinyl acetate-acrylic acid copolymer, and salts thereof. Among these, a copolymer of a monomer having a hydrophobic functional group and a monomer having a hydrophilic functional group, and a polymer formed from monomers having both the hydrophobic functional group and the hydrophilic functional group are preferable. With regard to the form of the copolymer, it is possible to use any form of a random copolymer, a block copolymer, an alternating copolymer, and a graft copolymer.

Examples of the salts include salts of basic compounds such as ammonia, ethylamine, diethylamine, triethylamine, propylamine, isopropylamine, dipropylamine, butylamine, isobutylamine, diethanolamine, triethanolamine, triisopropanolamine, aminomethyl propanol, and morpholine. The amount of these basic compounds added is not particularly limited as long as the amount is equal to or greater than the neutralization equivalent of the resin dispersant.

The molecular weight of the resin dispersant is preferably within a range of 1,000 to 100,000 and more preferably within a range of 3,000 to 10,000, as the weight average molecular weight. By the molecular weight being within the above range, the pigment is more stably dispersed in water, and control of the viscosity and the like are easily performed when applied to the ink composition.

It is also possible to use commercially available products as the resin dispersant. Specific examples thereof include JONCRYL 67 (weight average molecular weight: 12,500, acid value: 213), JONCRYL 678 (weight average molecular weight: 8,500, acid value: 215), JONCRYL 586 (weight average molecular weight: 4,600, acid value: 108), JONCRYL 611 (weight average molecular weight: 8,100, acid value: 53), JONCRYL 680 (weight average molecular weight: 4,900, acid value: 215), JONCRYL 682 (weight average molecular weight: 1,700, acid value: 238), JONCRYL 683 (weight average molecular weight: 8,000, acid value: 160), and JONCRYL 690 (weight average molecular weight: 16,500, acid value: 240) (all above products manufactured by BASF Japan Ltd.).

As the method of dispersing the resin-dispersed pigment in water, the pigment described above, a resin dispersant, and water, and when necessary, a water-soluble organic solvent, a neutralizing agent, and the like are added, and it is possible to perform dispersion using a disperser of the related art, such as a ball mill, a sand mill, an attritor, a roll mill, an agitator mill, a Henschel mixer, a colloid mill, an ultrasonic homogenizer, a jet mill, an angmill, or the like. In this case, as the particle diameter of the pigment, performing dispersion until the average particle diameter reaches 20 nm to 500 nm, and more preferably 40 nm to 200 nm, is preferable from the viewpoint of securing the dispersion stability of the pigment in water.

The amount of the resin dispersant added is preferably 10 parts by mass to 90 parts by mass and more preferably 30 parts by mass to 80 parts by mass with respect to 100 parts by mass of the pigment. By the amount of the resin dispersant added being within the above range, the dispersion stability of the pigment in water is further improved.

Self-Dispersing Pigment

The aqueous ink composition according to the embodiment can contain a self-dispersing pigment as a pigment. By using a self-dispersing pigment, the viscosity of the aqueous ink composition is likely to be adjusted within a suitable range, and thus, handling is easy. In addition, the self-dispersing pigment can be uniformly dispersed in the aqueous ink composition even in a case where a dispersant is not separately blended.

The "self-dispersing pigment" in the present specification refers to a surface-modified pigment obtained by bonding at least one functional group selected from among a carbonyl group, a carboxyl group, an aldehyde group, a hydroxyl group, a sulfone group, an ammonium group, and salts thereof to the surface of the self-dispersing pigment directly or indirectly through an alkyl group or an aryl group.

In preparation of the self-dispersing pigment, functional groups or molecules containing a functional group are subjected to chemical bonding such as coordination, grafting, or the like to the surface of the pigment by a physical treatment or a chemical treatment such as vacuum plasma or the like, whereby a self-dispersing pigment is obtained. For example, the self-dispersing pigment can be obtained by the method described in JP-A-8-3498. In addition, as the self-dispersing pigment, commercially available products can be used, and examples thereof include "Microjet CW1" and "Microjet CW2" manufactured by Orient Chemical Industries Co., Ltd., and "CAB-O-JET 200" and "CAB-0-JET 300" manufactured by Cabot Corporation.

A specific example of the preparation method of the self-dispersing pigment will be described below. First, the above pigment (a pigment before surface-modification) is added to a solvent, and this is sheared at high speed using a high-speed mixer or the like, or impact-dispersed using a bead mill or a jet mill, whereby a slurry-form pigment dispersion is obtained. While slowly stirring the pigment dispersion, a treating agent including sulfur (sulfamic acid, fuming sulfuric acid, sulfuric acid, chlorosulfonic acid, fluorosulfonic acid, amidosulfuric acid, or the like) is added thereto, and by heat-treating the pigment dispersion at 60° C. to 200° C., a dispersibility-imparting group is introduced to the pigment surface. After removing the solvent from the pigment dispersion, a self-dispersing pigment can be obtained by removing the treating agent including sulfur by repeatedly performing washing with water, ultrafiltration, reverse osmosis, centrifugation, filtration, or the like. The average particle diameter of the self-dispersing pigment is preferably 20 nm to 500 nm and more preferably 40 nm to 200 nm. Accordingly, the dispersion stability of the pigment in water is further improved.

1.1.1.2. Disperse Dye

The disperse dye is dispersed in a dispersion medium in an ink, and is a dye having a property of sublimating by heating (sublimation dye). Among the various colorants, the disperse dye is excellent from the viewpoint of being capable of obtaining a vivid hue and dyeing characteristics (for example, dyeing reproducibility, robustness, resistance to staining of the white ground, or the like) with respect to a material to be dyed. On the other hand, in the inks in the related art, in the case of including a disperse dye, a problem in that contaminations as an aggregate of a material including a disperse dye in an ink are generated is likely to occur, but in the invention, it is possible to reliably prevent an occurrence of such a problem. That is, according to the invention, it is possible to prevent an occurrence of the above problem while exhibiting the advantages of using a disperse dye.

Examples of the disperse dye include C. I. Disperse Yellow 3, 7, 8, 23, 39, 51, 54, 60, 71, and 86; C. I. Disperse Orange 1, 1:1, 5, 20, 25, 25:1, 33, 56, and 76; C. I. Disperse Brown 2; C. I. Disperse Red 11, 50, 53, 55, 55:1, 59, 60, 65, 70, 75, 93, 146, 158, 190, 190:1, 207, 239, and 240; C. I. Vat Red 41; C. I. Disperse Violet 8, 17, 23, 27, 28, 29, 36, and 57; C. I. Disperse Blue 19, 26, 26:1, 35, 55, 56, 58, 64, 64:1, 72, 72:1, 81, 81:1, 91, 95, 108, 131, 141, 145, and 359; and C. I. Solvent Blue 36, 63, 105, and 111. These may be used alone or in combination of two or more types thereof.

Although the content of the disperse dye in the ink is not particularly limited, the content is preferably 1% by mass to 10% by mass and more preferably 2% by mass to 8% by mass with respect to the total mass (100% by mass) of the aqueous ink composition. Thus, it is possible to achieve both a sufficient dyeing concentration and an ink jet characteristic such as discharge stability or recoverability after being left to stand at a higher level. In addition, in a case where a plurality of types of disperse dyes are included in an ink, the sum total of these contents is preferably within the above range.

In dispersion of a disperse dye, it is possible to use a dispersion resin. By including such a dispersion resin, it is possible to improve the dispersion stability of a disperse dye in an ink, the preservation stability of the ink, and the discharge stability of droplets by an ink jet system.

As the dispersion resin, for example, a known dispersion resin can be used, preferable specific examples include a styrene-acrylic copolymer and an anionic dispersion resin such as polyacrylate or polycarboxylate, and one selected from these can be used or two or more types selected from these can be used in combination.

In addition, in dispersion of a disperse dye, it is possible to use an anionic surfactant. By including an anionic surfactant, it is possible to improve the dispersion stability of the disperse dye. Examples of the anionic surfactant include a formalin condensate of an aromatic sulfonic acid, a formalin condensate of β-naphthalene sulfonic acid, a formalin condensate of an alkylnaphthalene sulfonic acid, and a formalin condensate of creosote oil sulfonic acid, and among these, one can be used or two or more types can be used in combination.

Among these anionic surfactants, a formalin condensate of an aromatic sulfonic acid is preferable. Thus, it is possible to particularly further increase the dispersion stability of the disperse dye. Examples of the "aromatic sulfonic acid" in the formalin condensate of the aromatic sulfonic acid include creosote oil sulfonic acid, cresol sulfonic acid, phenol sulfonic acid, β-naphthol sulfonic acid, alkyl naphthalene sulfonic acids such as methyl naphthalene sulfonic acid and butyl naphthalene sulfonic acid, a mixture of β-naphthalene sulfonic acid and β-naphthol sulfonic acid, a mixture of cresol sulfonic acid and 2-naphthol-6-sulfonic acid, and lignin sulfonic acid.

Although the content of an anionic surfactant in the aqueous ink composition is not particularly limited, the content is preferably 1% by mass to 30% by mass and more preferably 1% by mass to 10% by mass. When the content of an anionic surfactant is within the above range, it is possible to further improve the dispersion stability or the preservation stability of the disperse dye.

1.1.2. Ionic Liquid

The aqueous ink composition according to the embodiment includes an ionic liquid. The ionic liquid is one type of a salt consisting of only ions, and a substance that takes a liquid state at lower temperatures due to a large molecular size and weak ionic interactions. The ionic liquid is in a liquid state at a very low temperature (typically, 200° C. or lower) in comparison with general inorganic salts (for example, NaCl (melting point: about 800° C.)).

In the aqueous ink composition according to the embodiment, contaminations derived from the coloring material or the members, or the fixing resin is dissolved by containing an ionic liquid, and thus, generation of contaminations in the ink is suppressed, and the preservation stability is improved. As a result of suppressing generation of contaminations in the ink flow path, the reliability of discharge stability from a recording head of an ink jet recording apparatus and clogging recoverability is also improved.

The ionic liquid blended in the aqueous ink composition according to the embodiment is not particularly limited as long as it corresponds with the definition described above, and a known ionic liquid can be used. Examples of the ionic liquid include at least one selected from an imidazolium salt, a pyridinium salt, a pyrrolidinium salt, a phosphonium salt, an ammonium salt, a guanidinium salt, an isouronium salt, and an isothiouronium salt. These salts may be used in combination of a plurality of types thereof. The types of anion of these salts are also not particularly limited, and examples thereof include halide ions ($I^-$, $Cl^-$, $Br^-$, and the like), $SCN^-$, $BF_4^-$, $PF_6^-$, $ClO_4^-$, $SbF_6^-$, $(CF_3SO_2)_2N^-$, $(CF_3CF_2SO_2)_2N^-$, $Ph_4B^-$, $(C_2H_4O_2)_2B^-$, $(CF_3SO_2)_3C^-$, $CF_3COO^-$, $CF_3SO_3^-$, $C_6F_5SO_3^-$, and $MeO(EtO)_2SO_3^-$.

Specific examples of the ionic liquid of an imidazolium salt include 1,3-dimethyl imidazolium trifluoromethane sulfonate ($DMI.CF_3SO_3$), 1-ethyl-3-methyl imidazolium bis[oxalate (2-)] borate, 1-ethyl-3-methyl imidazolium tetrafluoroborate ($EMI.BF_4$), 1-ethyl-3-methyl imidazolium bromide (EMI.Br), 1-ethyl-3-methyl imidazolium chloride (EMI.Cl), 1-ethyl-3-methyl imidazolium hexafluorophosphate ($EMI.PF_6$), 1-ethyl-3-methyl imidazolium trifluoromethane sulfonate ($EMI.CF_3SO_3$), 1-ethyl-3-methyl imidazolium trifluoroacetate, 1-ethyl-3-methyl imidazolium methyl sulfate, 1-ethyl-3-methyl imidazolium p-toluene sulfonate, 1-ethyl-3-methyl imidazolium thiocyanate, 1-ethyl-3-methyl imidazolium 2-(2-methoxyethoxy)ethyl sulfate, 1-ethyl-3-methyl imidazolium bis(trifluoromethylsulfonyl) imide, 1-butyl-3-methyl imidazolium trifluoromethane sulfonate ($BMI.CF_3SO_3$), 1-butyl-3-methyl imidazolium tetrafluoroborate, 1-butyl-3-methyl imidazolium hexafluorophosphate, 1-butyl-3-methyl imidazolium methyl sulfate, 1-butyl-3-methyl imidazolium chloride (BMI.Cl), 1-butyl-3-methylimidazolium bromide (BMI.Br), 1-butyl-3-methyl imidazolium trifluoroacetate, 1-butyl-3-methyl imidazolium octyl sulfate, 1-hexyl-3-methyl imidazolium bis(trifluoromethylsulfonyl) imide, 1-hexyl-3-methyl imidazolium chloride (HMI.Cl), 1-hexyl-3-methyl imidazolium tetrafluoroborate (HMI.BFd, 1-hexyl-3-methyl imidazolium hexafluorophosphate ($HMI.PF_6$), 1-hexyl-3-methyl imidazolium tris(pentafluoroethyl) trifluorophosphate, 3-methyl-1-octyl imidazolium hexafluorophosphate ($MOI.PF_6$), 3-methyl-1-octyl imidazolium chloride (MOI.Cl), 3-methyl-1-octyl imidazolium tetrafluoroborate ($MOI.BF_4$), 3-methyl-1-octyl-imidazolium bis(trifluoromethylsulfonyl) imide, 3-methyl-1-octyl imidazolium octyl sulfate, 3-methyl-1-tetradecyl-imidazolium tetrafluoroborate, 1-hexadecyl-3-methyl imidazolium chloride, 3-methyl-1-octadecyl imidazolium hexafluorophosphate, 3-methyl-1-octadecyl imidazolium bis(trifluoromethylsulfonyl) imide, 3-methyl-1-octadecyl imidazolium tri(pentafluoroethyl) trifluorophosphate, 1-ethyl-2,3-dimethyl imidazolium bromide, 1-ethyl-2,3-dimethyl imidazolium tetrafluoroborate, 1-ethyl-2,3-dimethyl imidazolium hexafluorophosphate, 1-ethyl-2,3-dimethyl imidazolium chloride, 1-ethyl-2,3-dimethyl imidazolium p-toluene sulfonate, 1-butyl-2,3-dimethyl imidazolium tetrafluoroborate, 1-butyl-2,3-dimethyl imidazolium chloride, 1-butyl-2,3-dimethyl imidazolium hexafluorophosphate, 1-butyl-2,3-dimethyl imidazolium octyl sulfate, 1-hexyl-2,3-dimethyl imidazolium chloride, 1-hexadecyl-2,3-dimethyl imidazolium chloride, 1-allyl-3-ethyl imidazolium bis(trifluoromethylsulfonyl) imide (AEIm TFSI), and 1,3-diallyl imidazolium bis(trifluoromethyl) imide (AAIm TFSI).

Specific examples of the ionic liquid of a pyridinium salt include N-ethyl pyridinium chloride (EPY.Cl), N-ethyl pyridinium bromide (EPY.Br), N-butyl pyridinium chloride (BPY.Cl), N-butyl pyridinium tetrafluoroborate ($BPY.BF_4$), N-butyl pyridinium hexafluorophosphate ($BPY.PF_6$), N-butyl pyridinium trifluoromethane sulfonate ($BPY.CF_3SO_3$), N-hexyl pyridinium tetrafluoroborate, N-hexyl pyridinium hexafluorophosphate, N-hexyl pyridinium bis(trifluoromethylsulfonyl) imide, N-hexyl pyridinium trifluoromethane sulfonate, N-octyl pyridinium chloride, 4-methyl-N-butyl pyridinium chloride, 4-methyl-N-butyl pyridinium tetrafluoroborate, 4-methyl-N-butyl pyridinium hexafluorophosphate, 3-methyl-N-butyl pyridinium chloride, 4-methyl-N-butyl pyridinium bromide, 3,4-dimethyl-N-butyl pyridinium chloride, and 3,5-dimethyl-N-butyl pyridinium chloride.

Specific examples of the ionic liquid of a pyrrolidinium salt include 1-butyl-1-methyl pyrrolidinium chloride (BMP.Cl), 1-butyl-1-methyl pyrrolidinium trifluoromethane sulfonate, 1-butyl-1-methyl pyrrolidinium bis(trifluoromethylsulfonyl) imide, 1-butyl-1-methyl pyrrolidinium tetrafluoroborate, 1-butyl-1-methyl pyrrolidinium hexafluorophosphate, 1-butyl-1-methyl pyrrolidinium tris(pentafluoroethyl) trifluorophosphate, 1-butyl-1-methyl pyrrolidinium trifluoroacetate, 1-hexyl-1-methyl pyrrolidinium chloride, and 1-methyl-1-octyl pyrrolidinium chloride.

Specific examples of the ionic liquid of a phosphonium salt include trihexyl (tetradecyl)phosphonium chloride, trihexyl (tetradecyl)phosphonium tris(pentafluoroethyl) trifluorophosphate, trihexyl (tetradecyl)phosphonium tetrafluoroborate, trihexyl (tetradecyl)phosphonium bis(trifluoromethylsulfonyl) imide, trihexyl (tetradecyl) phosphonium hexafluorophosphate, and trihexyl (tetradecyl) phosphonium bis[oxalate (2-)] borate.

Specific examples of the ionic liquid of an ammonium salt include methyl trioctyl ammonium trifluoroacetate, methyl trioctyl ammonium trifluoromethane sulfonate, and methyl trioctyl ammonium bis(trifluoromethylsulfonyl) imide.

Specific examples of the ionic liquid of a guanidinium salt include N"-ethyl-N,N,N',N'-tetramethyl guanidinium tris(pentafluoroethyl) trifluorophosphate, guanidinium tris(pentafluoroethyl) trifluorophosphate, guanidinium trifluoromethane sulfonate, and N"-ethyl-N,N,N',N'-tetramethyl guanidinium trifluoromethane sulfonate.

Specific examples of the ionic liquid of an isouronium salt include O-ethyl-N,N,N',N'-tetramethyl isouronium trifluoromethane sulfonate and O-ethyl-N,N,N',N'-tetramethyl isouronium tri(pentafluoroethyl) trifluorophosphate.

Specific examples of the ionic liquid of an isothiouronium salt include S-ethyl-N,N,N',N'-tetramethyl isothiouronium trifluoromethane sulfonate and S-ethyl-N,N,N',N'-tetramethyl isothiouronium tris(pentafluoroethyl) trifluorophosphate.

In the present specification, an ionic compound which can take a liquid state at a temperature lower than 150° C. is defined as an ionic liquid. Therefore, among the above-exemplified ionic liquids, ionic liquids having a melting point of lower than 150° C. are referred to as the ionic liquids of the embodiment. Moreover, the ionic liquid has a feature of having low volatility and a broad liquid phase temperature range.

From the viewpoint of ensuring discharge stability from a head due to low viscosity, the ionic liquid preferably has a low melting point. The melting point of the ionic liquid can be adjusted by mainly the structure and the type of organic ions. Examples of the type of ionic liquid which tends to have a low melting point include an imidazolium salt, a pyridinium salt, an ammonium salt, and a phosphonium salt, which has 24 or less carbon atoms, preferably 18 or less carbon atoms, and more preferably 12 or less carbon atoms, and examples of the counterion thereof include $Cl^-$, $BF_4^-$, $PF_6^-$, and $(CF_3SO_2)_2N^-$.

The aqueous ink composition according to the embodiment may contain two or more types of ionic liquids described above. Depending on the type of ionic liquid, the sizes or the types of molecules that can be dissolved are different. Thus, by including two or more types of ionic liquids, in a case where plural kinds of contaminations or plural kinds of compounds constituting contaminations are present or the like, it is possible to dissolve the respective compounds. Therefore, it is possible to more effectively suppress generation of contaminations or to more effectively dissolve the generated contaminations. In addition, by adding two or more types of ionic liquids, the total amount of entire ionic liquids added can be reduced. The number of types or the combination in a case where plural types of ionic liquids are contained is not particularly limited, and can be designed in accordance with the type of contaminations and the situation. Moreover, the ionic liquid can be suitably synthesized according to the method in the related art, and can be synthesized by a technique of so-called design chemistry. In addition, as the ionic liquid, commercial products may be used.

The total content of the ionic liquid in the aqueous ink composition according to the embodiment can be within a range in which the ionic liquid can be compatible with the solvent in the aqueous ink composition, and when the total mass of the aqueous ink composition is 100% by mass, the total content is typically 0.05% by mass to 5.0% by mass. The lower limit value of the content is preferably equal to or greater than 0.1% by mass, more preferably equal to or greater than 0.3% by mass, and particularly preferably equal to or greater than 0.5% by mass. When the content of the ionic liquid is equal to or greater than the lower limit value, an effect of dissolving contaminations derived from a coloring material or members, or a fixing resin, or the like in the ink can be exhibited, and it is possible to suppress generation of contaminations. The upper limit value of the content is preferably equal to or less than 4.5% by mass and more preferably equal to or less than 4.0% by mass. When the content of the ionic liquid is equal to or less than the upper limit value, the viscosity of the ink does not become too large, and thus, it is possible to ensure discharge stability from the head, and the ink discharged on a recording medium is quickly dried, and thus, it is possible to form an image having excellent print quality, without bleeding of the ink.

The aqueous ink composition according to the embodiment can dissolve contaminations resulting due to intertwining of a fixing resin included in the ink, contaminations derived from the impurities of the coloring material (typically, coloring matter analogues), contaminations derived from the impurities (for example, a higher fatty acid (salt) having 10 or more carbon atoms such as stearic acid (salt)) which have been eluted from the member of the ink jet recording apparatus (a tube, or the like) into the flow path, and/or contaminations formed by mixing of these impurities, by including an ionic liquid. Thus, generation of contaminations in the aqueous ink composition is suppressed. As a result, the preservation stability of the ink and the discharge stability from the recording head are improved, and due to this, clogging is suppressed, and the reliability is improved.

In addition, the ionic liquid included in the aqueous ink composition according to the embodiment is preferably water-soluble. The "water-soluble" in the invention refers to properties in which equal to or greater than 0.5 g of a solute can be dissolved in 100 g of water at 25° C. Since, in the aqueous ink composition, the ionic liquid exhibits excellent effects of dissolving contaminations by being compatible with water, an ionic liquid of which 0.5 g to 50 g or 1 g to 100 g is dissolved in 100 g of water at 25° C. is more preferably selected.

1.1.3. Other Components

Water

The aqueous ink composition according to the embodiment contains water as a solvent. As water, pure water such as ion exchange water, ultrafiltration water, reverse osmosis water, and distilled water, or ultrapure water can be used. The content of the water in the aqueous ink composition according to the embodiment is preferably equal to or greater than 30% by mass, more preferably 50% by mass to 95% by mass, and particularly preferably 60% by mass to 90% by mass, with respect to the total mass (100% by mass) of the aqueous ink composition. Here, the content of water is not limited to the amount of water added, and in a case where other additives are added, the water in the additives is also included.

Polar Organic Solvent

The aqueous ink composition according to the embodiment preferably contains a polar solvent from the viewpoint of controlling wet spreading properties on a recording medium, permeability, and drying properties. However, in the polar solvent, there is a substance dissolving the coloring material-derived component described above, although the amount is very slight. It is known that a part of the dissolved coloring material-derived component is reprecipitated with a change in temperature environment, and due to this, crystalline contaminations are formed, and there was a problem in that the contaminations slowly clog a head filter, and this causes discharge failure of an ink. According to the aqueous ink composition according to the embodiment, by dissolving the contaminations due to the coloring material-derived component with an ionic liquid, it is possible to solve the problem.

Examples of the polar solvent used in the aqueous ink composition according to the embodiment include alkane diols, alkylene glycol ethers, pyrrolidones, amides, and lactones. Since the aqueous ink composition containing such a polar solvent is likely to dissolve the coloring material-derived component compared to other solvents, the problem of discharge failure of an ink due to the contaminations tends to easily occur. Specific examples of the polar solvent which can be used in the aqueous ink composition according to the embodiment are listed below.

(1) Alkane Diols

Examples of the alkane diols include 1,2-alkane diols such as 1,2-propanediol, 1,2-butanediol, 1,2-pentanediol, 1,2-hexanediol, 1,2-heptanediol, and 1,2-octanediol; 1,3-alkane diols such as 1,3-butanediol, 1,3-pentanediol, 1,3-hexanediol, 1,3-heptanediol, and 1,3-octanediol; and other diols such as 2-methyl-1,3-propanediol, 2,2-dimethyl-1,3-propanediol, 2-ethyl-1,3-propanediol, 2,2-diethyl-1,3-propanediol, 2-ethyl-2-methyl-1,3-propanediol, 2-butyl-2-ethyl-1,3-propanediol, 2-ethyl-1,3-hexanediol, 3-methyl-1,5-pentanediol, 2,5-hexanediol, and 2,3-dimethyl-1,4-butanediol.

(2) Alkylene Glycol Ethers

Examples of the alkylene glycol ethers include ethylene glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, tetraethylene glycol monobutyl ether, ethylene glycol dimethyl ether, diethylene glycol dimethyl ether, triethylene glycol dimethyl ether, tetraethylene glycol dimethyl ether, ethylene glycol diethyl ether, diethylene glycol diethyl ether, triethylene glycol diethyl ether, ethylene glycol ethyl methyl ether, diethylene glycol ethyl methyl ether, and triethylene glycol ethyl methyl ether; and propylene glycol ethers such as propylene glycol monomethyl ether, dipropylene glycol monomethyl ether, tripropylene glycol monomethyl ether, propylene glycol monoethyl ether, dipropylene glycol monoethyl ether, and tripropylene glycol monoethyl ether.

(3) Pyrrolidones

Examples of the pyrrolidones include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and 1-(2-hydroxyethyl)-2-pyrrolidone.

(4) Amides

Examples of the amides include dimethyl formamide, dimethyl acetamide, diethyl formamide, diethyl acetamide, Equamide M100 (trade name, manufactured by Idemitsu Kosan Co., Ltd.), and Equamide B100 (trade name, manufactured by Idemitsu Kosan Co., Ltd.)

(5) Lactones

Examples of the lactones include α-acetolactone, α-ethyl lactone, β-propiolactone, γ-butyrolactone, δ-valerolactone, ε-caprolactone, ζ-enantiomeric lactone, η-caprylolactone, γ-valerolactone, γ-heptalactone, γ-nonalactone, β-methyl-δ-valerolactone, 2-butyl-2-ethyl propiolactone, and α,α-diethyl propiolactone.

The content of the polar solvent in the aqueous ink composition according to the embodiment is preferably 0.1% by mass to 20% by mass and more preferably 0.5% by mass to 10% by mass with respect to the total mass (100% by mass) of the aqueous ink composition.

Other Organic Solvents

The aqueous ink composition according to the embodiment may contain a water-soluble organic solvent other than the polar solvents described above. Such a water-soluble organic solvent is not particularly limited, and examples thereof include alcohols (for example, ethyl alcohol, 1-propanol, and fluorinated alcohol) and polyhydric alcohols (for example, polyalkylene glycol and glycerol). In particular, glycerin functions as a humectant, and has effects of making drying more difficult even in a case where the aqueous ink composition is left in a state of being exposed to air. These water-soluble organic solvents may be used alone or in combination of two or more types thereof.

In a case where these water-soluble organic solvents are blended, the content of the water-soluble organic solvents is preferably 0.1% by mass to 30% by mass and more preferably 0.5% by mass to 20% by mass when the total amount of the aqueous ink composition is 100% by mass.

Fixing Resin

The aqueous ink composition according to the embodiment may contains a resin (in the present specification, also referred to as a "fixing resin") for fixing the coloring material described above onto a recording medium. The fixing resin is preferably supplied in a form of being water-soluble, a dispersion, or an emulsion.

In the ink composition for industrial applications, to improve fixing of a coloring material onto a recording medium, a large amount of fixing resin emulsion is added in some cases. With the increase in the content of the fixing resin, there is a growing concern that contaminations derived from the fixing resin will be generated. In particular, in a case where a fixing resin having a glass transition temperature (Tg) of 0° C. or lower is included, contaminations tend to easily result due to intertwining of the hydrophobic portions of the resin in an ink. However, according to the aqueous ink composition according to the embodiment, contaminations resulting due to intertwining of the fixing resin are dissolved by an ionic liquid, and thus, generation of contaminations is suppressed, and preservation stability is improved.

The fixing resin is preferably at least one resin selected from the group consisting of a urethane resins, an acrylic resin, and a styrene-acrylate resin. By containing these fixing resins, fixability onto a recording medium can be improved, and abrasion resistance can also be improved.

The urethane resin is not particularly limited as long as the urethane resin has a urethane bond in the molecule, and a polyether type urethane resin including an ether bond in the main chain, a polyester type urethane resin including an ester bond in the main chain, and a polycarbonate type urethane resin including a carbonate bond in the main chain, in addition to the urethane bond, can also be used.

As the fixing resin, a self-reactive type urethane resin, acrylic resin, or styrene acrylate resin may be used. Examples of the self-reactive type resin include a urethane resin blocked by a blocking agent having a hydrophilic group; a blocked urethane resin obtained by imparting a hydrophilic segment; and an acrylic resin obtained by copolymerizing an acrylic monomer having a functional group such as a carboxyl group, a hydroxyl group, an amino group, or a methylol group.

Examples of the commercially available products of the urethane resin emulsion include Suncure 2710 (manufactured by Lubrizol Corp.), Permarin UA-150 (manufactured by Sanyo Chemical Industries, Ltd.), Superflex 150, 420, 460, 470, 610, and 700 (hereinbefore, manufactured by Dai-ichi Kogyo Seiyaku Co., Ltd.), NeoRez R-9660, R-9637, and R-940 (hereinbefore, manufactured by Kusumoto Chemicals, Ltd.), Adeka Bontighter HUX-380 and 290K (hereinbefore, manufactured by Adeka Co., Ltd), and Takelac (R) W-605, W-635, and WS-6021 (hereinbefore, manufactured by Mitsui Chemicals, Inc.).

Examples of the commercially available products of the styrene acrylate resin or the acrylic resin include Mowinyl 966A and Mowinyl 7320 (manufactured by Nippon Synthetic Chemicals Industry Co., Ltd.), Microgel E-1002 and Microgel E-5002 (hereinbefore, manufactured by Nippon Paint Co., Ltd.), Voncoat 4001 and Voncoat 5454 (hereinbefore, manufactured by DIC Corp.), SAE1014 (manufactured by Nippon Zeon Corp.), Saibinol SK-200 (manufactured by SAIDEN CHEMICAL INDUSTRY CO., LTD.), JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, and JONCRYL 7610 (hereinbefore, manufactured by BASF Corp.), NK binder R-5HN (manufactured by Shin-Nakamura Chemical Co.), and PARALOID B60 (manufactured by Rohm & Haas Company).

The content of the fixing resin (solid content) in the aqueous ink composition according to the embodiment is preferably 0.1% by mass to 5% by mass and more preferably 0.5% by mass to 4% by mass with respect to the total mass (100% by mass) of the aqueous ink composition.

Surfactant

The aqueous ink composition according to the embodiment may include a surfactant. As the surfactant, any of a nonionic surfactant, an anionic surfactant, a cationic surfactant, and an amphoteric surfactant can be used, and these may be used in combination.

The nonionic surfactant is preferably at least one selected from the group consisting of an acetylene glycol-based surfactant, an acetylene alcohol-based surfactant, a fluorine-based surfactant, and a silicon-based surfactant. These nonionic surfactants have excellent ability to suitably maintain the surface tension and the interfacial tension of an aqueous ink composition. Thus, since the surface tension and the interfacial tension with a printer member coming into contact with the ink of a head nozzle surface or the like can be suitably maintained, it is possible to increase the discharge stability in a case where the nonionic surfactant is applied to the ink jet recording method.

As the acetylene glycol-based surfactant and the acetylene alcohol-based surfactant, which are not limited to the following, one or more types selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyn-4-ol, 3,6-dimethyl-4-octyne-3,6-diol, 3,5-dimethyl-1-hexyne-3-ol, or 2,4-dimethyl-5-hexyne-3-ol can be exemplified. In addition, as the acetylene glycol-based surfactant and the acetylene alcohol-based surfactant, commercially available products can be used, and examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, and GA (all above products manufactured by Air Products and Chemicals. Inc.); Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all above products manufactured by Nissin Chemical Co., Ltd.), and Acetylenol E00, E00P, E40, and E100 (all above products manufactured by Kawaken Fine Chemicals. Co., Ltd.).

As the fluorine-based surfactant, commercially available products may be used, and examples thereof include Megafac F-479 (manufactured by DIC Corp.) and BYK-340 (manufactured by BYK Japan KK).

As the silicon-based surfactant, commercially available products can be used, and examples thereof include Olfine PD-501, Olfine PD-502, and Olfine PD-570 (all are manufactured by Nissin Chemical Co., Ltd.), and BYK-347 and BYK-348 (all are manufactured by BYK Japan KK).

Furthermore, as the nonionic surfactant, a polyoxyethylene alkyl ether, a polyoxyethylene alkyl phenyl ether, an alkyl glucoside, a polyoxyalkylene glycol alkyl ether, a polyoxyalkylene glycol, a polyoxyalkylene glycol alkyl phenyl ether, a sucrose fatty acid ester, a polyoxyethylene fatty acid ester, a polyoxyethylene sorbitan fatty acid ester, a sorbitan fatty acid ester, a polyoxyalkylene acetylene glycol, a polyoxyalkylene glycol alkyl amine, a polyoxyethylene alkyl amine, a polyoxyethylene alkyl amine oxide, a fatty acid alkanolamide, an alkylolamide, or a polyoxyethylene polyoxypropylene block polymer may be used.

In addition, among the nonionic surfactants, the acetylene glycol-based surfactant has excellent ability to suitably maintain the surface tension and the interfacial tension and hardly has foaming properties, and thus, the acetylene glycol-based surfactant can be more preferably used. That is, since foaming properties of the acetylene glycol-based surfactant are low, for example, in a case where an aqueous ink composition is applied to an ink jet recording apparatus, bubbles are less likely to be fixed to the step portion of the ink flow path, and thus, the acetylene glycol-based surfactant is desirable.

Examples of the anionic surfactant include a higher fatty acid salt, soap, an α-sulfo fatty acid methyl ester salt, a linear alkyl benzene sulfonate, an alkyl sulfonate, an alkyl ether sulfonic acid ester salt, a monoalkyl phosphate, an α-olefin sulfonate, an alkyl benzene sulfonate, an alkyl naphthalene sulfonate, a naphthalene sulfonate, an alkane sulfonate, a polyoxyethylene alkyl ether sulfate, a sulfosuccinate, and a polyoxyalkylene glycol alkyl ether phosphate.

Examples of the cationic surfactant include an alkyl trimethyl ammonium salt, a dialkyl dimethyl ammonium salt, and an alkyl dimethyl benzyl ammonium salt as quaternary ammonium-based cationic surfactant, and an N-methylbishydroxyethyl amine fatty acid ester hydrochloride as an amine salt-based cationic surfactant.

Examples of the amphoteric surfactant include an alkyl amino fatty acid salt as an amino acid-based amphoteric surfactant, an alkyl carboxyl betaine as a betaine-based amphoteric surfactant, and an alkyl amine oxide as amine oxide-based amphoteric surfactant. The amphoteric surfactant is not limited thereto.

The content of the surfactant is preferably 0.1% by mass to 2% by mass and more preferably 0.2% by mass to 1% by mass when the total amount of the aqueous ink composition is 100% by mass.

pH Adjusting Agent

The pH of the aqueous ink composition according to the embodiment may be adjusted to preferably 6.0 to 10.0 and more preferably 7.0 to 9.5 by adding a pH adjusting agent.

Examples of the pH adjusting agent include alkanolamines such as diethanolamine, triethanolamine, dimethylethanolamine, and diethylethanolamine; hydroxides of alkali metals such as lithium hydroxide, sodium hydroxide, potassium hydroxide, and lithium hydroxide; ammonium hydroxide; carbonates of alkali metals such as lithium carbonate, sodium carbonate, and potassium carbonate; and aminosulfonic acids such as taurine.

Other Components

For a chelating agent, a preservative, a viscosity modifier, a solubilizer, an antioxidant, an antifungal agent, and the like, known materials can be used.

1.1.4. Content Ratio

In the aqueous ink composition according to the embodiment, the content ratio of the ionic liquid to the coloring material (ionic liquid content/coloring material content) is preferably 0.01 to 1, more preferably 0.1 to 1, still more preferably 0.2 to 1, and particularly preferably 0.4 to 1. When the content ratio of the ionic liquid to the coloring material is within the above range, the balance of the content ratio of the ionic liquid and the coloring material included in the aqueous ink composition is improved, and thus, it is possible to effectively suppress generation of contaminations derived from the coloring material, and the preservation stability is improved. In addition, by suppressing generation of contaminations derived from the coloring material in the aqueous ink composition, clogging of the head filter due to the contaminations is eliminated, and the discharge stability of the ink is improved. In a case where the content ratio of the ionic liquid to the coloring material (ionic liquid content/coloring material content) is less than 0.01, the content of the ionic liquid to the coloring material is small, and thus, the effects of dissolving contaminations derived from the coloring material in the aqueous ink composition are reduced. Therefore, the contaminations derived from the coloring material are generated due to a change in temperature environment, and this causes discharge failure of an ink in some cases. In contrast, in a case where the content ratio of the ionic liquid to the coloring material (ionic liquid content/coloring material content) is greater than 1, the content of the ionic liquid to the coloring material is great, and thus, the effects of dissolving the contaminations derived from the coloring material in the aqueous ink composition are not impaired, but the drying properties of the ink discharged on a recording medium are reduced, and due to this, the print quality is impaired by bleeding or the like in some cases.

In the aqueous ink composition according to the embodiment, the content ratio of the ionic liquid to the fixing resin (ionic liquid content/fixing resin content) is preferably 0.01 to 5, more preferably 0.1 to 4.5, still more preferably 0.2 to 4, and particularly preferably 0.4 to 3. When the content ratio of the ionic liquid to the fixing resin is within the above range, the balance of the content ratio of the ionic liquid and the fixing resin included in the aqueous ink composition is improved, and thus, it is possible to effectively suppress generation of contaminations derived from the fixing resin, and the preservation stability is improved. In addition, by suppressing generation of contaminations derived from the fixing resin in the aqueous ink composition, clogging of the head filter due to the contaminations is eliminated, and the discharge stability of the ink is improved. In a case where the content ratio of the ionic liquid to the fixing resin (ionic liquid content/fixing resin content) is less than 0.01, the content of the ionic liquid to the fixing resin is small, and thus, the effects of dissolving contaminations derived from the fixing resin in the aqueous ink composition are reduced. Therefore, the contaminations derived from the fixing resin are generated due to a change in temperature environment, and this causes discharge failure of an ink in some cases. In contrast, in a case where the content ratio of the ionic liquid to the fixing resin (ionic liquid content/fixing resin content) is greater than 5, the content of the ionic liquid to the fixing resin is great, and thus, the effects of dissolving the contaminations derived from the fixing resin in the aqueous ink composition are not impaired, but the drying properties of the ink discharged on a recording medium are reduced, and due to this, the print quality is impaired by bleeding or the like in some cases.

1.1.5. Physical Properties

In a case where the aqueous ink composition according to the embodiment is used as an ink for an ink jet, for example, by adjusting the composition or the combination, the viscosity (viscosity at 25° C.) is set to preferably 2 mPa·s to 20 mPa·s and more preferably 3 mPa·s to 15 mPa·s. Thus, the discharge stability (stability of discharging amount, flight characteristics of droplets, or the like) and the discharging responsiveness (a response speed, a high frequency correspondence (frequency characteristics), or the like) of the ink for an jet ink can be improved. Moreover, the viscosity of the ink for an ink jet can be determined by measurement based on JIS 28809 using a vibration type viscometer.

1.2. Solvent-Based Ink Composition

The "solvent-based ink composition" in the present specification means an ink which has an organic solvent as a main component and does not substantially include water. Here, the expression "does not substantially include water" means that water is not intentionally added when an ink composition is prepared, and it is not problematic even if a minute amount of water inevitably mixed in during preparation or during storage of the ink composition is included.

Moreover, the specific content of water in "the ink which does not substantially include water" refers to the fact that the content of water in the ink is preferably equal to or less than 3% by mass, more preferably equal to or less than 1% by mass, still more preferably less than 0.05% by mass, still more preferably less than 0.01% by mass, still more preferably less than 0.005% by mass, and most preferably less than 0.001% by mass.

1.2.1. Coloring Material

The solvent-based ink composition according to the embodiment contains a pigment or a disperse dye as a coloring material. The coloring material of the same type and the same content as in the aqueous ink composition described above can be used.

1.2.2. Ionic Liquid

The solvent-based ink composition according to the embodiment contains an ionic liquid. The ionic liquid of the same type and the same content as in the aqueous ink composition described above can be used. Moreover, the ionic liquid included in the solvent-based ink composition according to the embodiment is preferably water-insoluble.

In addition, "water-insoluble" in the invention indicates a substance which is not "water-soluble" described above, or may be properties in which equal to or greater than 0.5 g of a solute can be compatible with 100 g of a hydrophobic organic solvent (including a mixed solvent) at 25° C. Since the ionic liquid exhibits excellent effects of dissolving contaminations by being compatible with a hydrophobic organic solvent, an ionic liquid of which 0.5 g to 50 g or 1 g to 100 g is compatible with 100 g of a hydrophobic organic solvent at 25° C. is preferably selected.

1.2.3. Other Components

Polar Solvent

The solvent-based ink composition according to the embodiment contains a polar solvent. Since the polar solvent is an important component which controls the ink characteristics, the polar solvent is necessarily included in the solvent-based ink composition. In the polar solvent, there is a substance dissolving the coloring material-derived component described above, although the amount is slight. It is known that a part of the dissolved coloring material-derived component is reprecipitated with a change in temperature environment, and due to this, crystalline contaminations are formed, and there was a problem in that the contaminations slowly clog a head filter, and this causes discharge failure of an ink. According to the solvent-based ink composition according to the embodiment, by dissolving the contaminations due to the coloring material-derived component with an ionic liquid, it is possible to solve the problem.

Examples of the polar solvent used in the solvent-based ink composition according to the embodiment include alkane diols, alkylene glycol ethers, pyrrolidones, amides, and lactones. Since the solvent-based ink composition containing such a polar solvent is likely to dissolve the coloring material-derived component, the problem of discharge failure due to the contaminations tends to easily occur.

The content of the polar solvent in the solvent-based ink composition according to the embodiment is preferably 50% by mass to 95% by mass and more preferably 60% by mass to 90% by mass with respect to the total mass (100% by mass) of the ink composition. Specific examples of the polar solvent which can be used in the solvent-based ink composition according to the embodiment are listed below.

(1) Alkane Diols

Examples of the alkane diols include 1,2-alkane diols such as 1,2-propanediol, 1,2-butanediol, 1,2-pentanediol, 1,2-hexanediol, 1,2-heptanediol, and 1,2-octanediol; 1,3-alkane diols such as 1,3-butanediol, 1,3-pentanediol, 1,3-hexanediol, 1,3-heptanediol, and 1,3-octanediol; and other diols such as 2-methyl-1,3-propanediol, 2,2-dimethyl-1,3-propanediol, 2-ethyl-1,3-propanediol, 2,2-diethyl-1,3-propanediol, 2-ethyl-2-methyl-1,3-propanediol, 2-butyl-2-ethyl-1,3-propanediol, 2-ethyl-1,3-hexanediol, 3-methyl-1,5-pentanediol, 2,5-hexanediol, and 2,3-dimethyl-1,4-butanediol.

(2) Alkylene Glycol Ethers

Examples of the alkylene glycol ethers include ethylene glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, tetraethylene glycol monobutyl ether, ethylene glycol dimethyl ether, diethylene glycol dimethyl ether, triethylene glycol dimethyl ether, tetraethylene glycol dimethyl ether, ethylene glycol diethyl ether, diethylene glycol diethyl ether, triethylene glycol diethyl ether, ethylene glycol ethyl methyl ether, diethylene glycol ethyl methyl ether, and triethylene glycol ethyl methyl ether; and propylene glycol ethers such as propylene glycol monomethyl ether, dipropylene glycol monomethyl ether, tripropylene glycol monomethyl ether, propylene glycol monoethyl ether, dipropylene glycol monoethyl ether, and tripropylene glycol monoethyl ether.

(3) Pyrrolidones

Examples of the pyrrolidones include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and 1-(2-hydroxyethyl)-2-pyrrolidone.

(4) Amides

By containing the amides, it is possible to improve the fixability of the ink attached onto a low-absorptive recording medium. Among the amides, a compound represented by the following General Formula (1) is preferable.

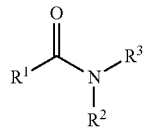

(1)

In Formula (1), $R^1$ represents an alkyl group having 1 to 8 carbon atoms, and the alkyl group may include an ether group. Each of $R^2$ and $R^3$ independently represents an alkyl group having 1 to 8 carbon atoms. $R^1$ and $R^2$ may be bonded to a cyclic alkyl group. The alkyl group having 1 to 8 carbon atoms may be linear or branched, and examples thereof include a methyl group, an ethyl group, an n-propyl group, an iso-propyl group, an n-butyl group, a sec-butyl group, an iso-butyl group, a tert-butyl group, an n-pentyl group, an n-hexyl group, an n-heptyl group, and an n-octyl group.

In the case of recording on a low-absorptive recording medium, the compound represented by General Formula (1) dissolves the recording surface, and thus, the ink can effectively penetrate into the inside of the recording medium. By penetration of the ink in this manner, the ink is firmly fixed, and the surface of the ink is likely to be dried. Therefore, the obtained image has excellent surface drying properties and fixability. In contrast, since the coloring material-derived component is likely to be dissolved compared to other solvents, the problem of discharge failure of an ink due to the contaminations tends to easily occur.

Among these amides, from the viewpoint of surface drying properties and fixability, dimethyl formamide, dimethyl acetamide, diethyl formamide, diethyl acetamide, Equamide M100 (trade name, manufactured by Idemitsu Kosan Co., Ltd.), or Equamide B100 (trade name, manufactured by Idemitsu Kosan Co., Ltd.) is more preferable.

The content of the amides in the ink composition according to the embodiment is preferably 0.5% by mass to 20% by mass and more preferably 1% by mass to 15% by mass with respect to the total mass (100% by mass) of the ink composition.

(5) Lactones

By containing the lactones, it is possible to improve the fixability of the ink attached onto a low-absorptive recording medium. Among the lactones, a compound represented by the following General Formula (2) is preferable.

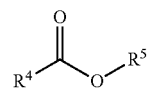

(2)

In Formula (2), each of $R^4$ and $R^5$ independently represents an alkyl group having 1 to 8 carbon atoms, and the alkyl group may include an ether group. $R^4$ and $R^5$ may be bonded to a cyclic alkyl group. The alkyl group having 1 to 8 carbon atoms may be linear or branched, and examples thereof include a methyl group, an ethyl group, an n-propyl group, an iso-propyl group, an n-butyl group, a sec-butyl group, an iso-butyl group, a tert-butyl group, an n-pentyl group, an n-hexyl group, an n-heptyl group, and an n-octyl group.

In the case of recording on a low-absorptive recording medium, the compound represented by General Formula (2) dissolves the recording surface, and thus, the ink can effectively penetrate into the inside of the recording medium. By penetration of the ink in this manner, the ink is likely to be firmly fixed. Therefore, the obtained image has excellent fixability. In contrast, since the coloring material-derived component is likely to be dissolved compared to other solvents, the problem of discharge failure due to the contaminations tends to easily occur.

Among these lactones, from the viewpoint of fixability, α-aceto lactone, α-ethyl lactone, β-propiolactone, γ-butyrolactone, δ-valerolactone, ε-caprolactone, ζ-enantiomeric lactone, η-caprylolactone, γ-valerolactone, γ-heptalactone, γ-nonalactone, β-methyl-δ-valerolactone, 2-butyl-2-ethyl propiolactone, or α,α-diethylpropiolactone is preferable.

The content of the lactones in the ink composition according to the embodiment is preferably 1% by mass to 30% by mass and more preferably 3% by mass to 20% by mass with respect to the total mass (100% by mass) of the ink composition.

Other Organic Solvents

The organic solvent other than the above-described polar solvent is not particularly limited, and examples thereof include alcohols (for example, ethyl alcohol, 1-propanol, and fluorinated alcohol) and ethers (for example, diethyl ether and dipropyl ether). These organic solvents may be used alone or in combination of two or more types thereof.

In a case where these organic solvents are blended, the content of the organic solvents is preferably 0.1% by mass to 30% by mass and more preferably 0.5% by mass to 20% by mass when the total amount of the ink composition is 100% by mass.

Fixing Resin

The solvent-based ink composition according to the embodiment may contains a resin (fixing resin) for fixing the coloring material described above onto a recording medium.

Examples of the fixing resin include an acrylic resin, a styrene acrylic resin, a rosin-modified resin, a phenol resin, a terpene-based resin, a polyester resin, a polyamide resin, an epoxy resin, a vinyl acetate resin, a vinyl chloride resin, a fiber-based resin such as cellulose acetate butyrate, and a vinyl toluene-α-methyl styrene copolymer resin. Among these, the fixing resin is preferably at least one type of resin selected from the group consisting of an acrylic resin, a vinyl chloride resin, and a vinyl acetate resin. By containing these fixing resins, fixability onto a recording medium can be improved, and abrasion resistance can also be improved.

The solid content of the fixing resin in the solvent-based ink composition according to the embodiment is preferably 0.05% by mass to 15% by mass and more preferably 0.1% by mass to 10% by mass. When the content of the fixing resin is within the above range, by the fixing resin dissolved in a polar solvent, excellent fixability with respect to a low-absorptive recording medium can be obtained.

Acrylic Resin

Examples of the acrylic resin include poly(meth)acrylic acid, polymethyl (meth)acrylate, polyethyl (meth)acrylate, a (meth)acrylic acid-(meth)acrylic acid ester copolymer resin, a styrene-(meth)acrylic copolymer resin, an ethylene-(meth)acrylic acid copolymer resin, an ethylene alkyl (meth)acrylate resin, and an ethylene-(meth)acrylic acid ester copolymer resin.

As the acrylic resin, commercially available products may be used, and examples thereof include ACRYPET MF (trade name, manufactured by Mitsubishi Rayon Co., Ltd., acrylic resin), SUMIPEX LG (trade name, manufactured by Sumitomo Chemical Co., Ltd., acrylic resin), PARALOID B series (trade name, manufactured by Rohm & Haas Company, acrylic resin), and PAPAPET G-1000P (trade name, manufactured by KURARAY Co., Ltd., acrylic resin). Moreover, in the invention, the (meth)acrylic acid means both acrylic acid and methacrylic acid, and (meth)acrylate means both acrylate and methacrylate.

Vinyl Chloride Resin and Vinyl Acetate Resin

Examples of the vinyl chloride resin and the vinyl acetate resin include polyvinyl chloride, polyvinyl acetate, and a copolymer (hereinafter, also referred to as a "vinyl chloride acetate copolymer") including a structural unit derived from vinyl chloride and vinyl acetate, and among these, a vinyl chloride acetate copolymer is preferable. The vinyl chloride acetate copolymer can be dissolved in the above-described polar solvent. As a result, by the vinyl chloride acetate copolymer dissolved in a polar solvent, an ink can be firmly fixed to the surface of a recording medium.

The vinyl chloride acetate copolymer can be obtained by an ordinary method, and for example, can be obtained by a suspension polymerization method. Specifically, water, a dispersant, and a polymerization initiator are put into a polymerization vessel, and after degassing, by pressing vinyl chloride and vinyl acetate thereinto, suspension polymerization is performed, or by pressing a part of vinyl chloride and vinyl acetate thereinto, a reaction is started, and while pressing the remaining vinyl chloride thereinto, suspension polymerization can be performed.

The vinyl chloride acetate copolymer preferably contains 70% by mass to 90% by mass of a vinyl chloride unit as a constituent. When the vinyl chloride unit is within the above range, the vinyl chloride acetate copolymer is stably dissolved in the ink composition, and thus, the long-term preservation stability is excellent. Furthermore, the discharge stability is excellent, and it is possible to obtain excellent fixability onto a recording medium.

In addition, the vinyl chloride acetate copolymer may have another structural unit when necessary, together with a vinyl chloride unit and a vinyl acetate unit, examples thereof include a carboxylic acid unit, a vinyl alcohol unit, and a hydroxy alkyl acrylate unit, and in particular, a vinyl alcohol unit is preferable. It is possible to obtain by using a monomer corresponding to each unit described above. Specific examples of the monomer which provides a carboxylic acid unit include maleic acid, itaconic acid, maleic anhydride, itaconic anhydride, acrylic acid, and methacrylic acid. Specific examples of the monomer which provides a hydroxy alkyl acrylate unit include hydroxyethyl (meth)acrylate and hydroxyethyl vinyl ether. The content of these monomers is not limited as long as it does not impair the effects of the invention, and for example, it is possible to copolymerize within a range of equal to or less than 15% by mass of the total amount of monomers.

In addition, as the vinyl chloride acetate copolymer, commercially available products may be used, and examples thereof include SOLBIN CN, SOLBIN CNL, SOLBIN CSR, SOLBIN TA5R, SOLBIN CL, and SOLBIN CLL (hereinbefore, manufactured by Nissin Chemical Co., Ltd.).

Although the average degree of polymerization of these resins is not particularly limited, the average degree is preferably 150 to 1100 and more preferably 200 to 750. In a case where the average degree of polymerization of these resins is within the above range, these resins are stably dissolved in the ink composition according to the embodiment, and thus, the long-term preservation stability is excellent. Furthermore, the discharge stability is excellent, and it is possible to obtain excellent fixability onto a recording medium. Moreover, the average degree of polymerization of these resins is a value obtained by measuring the specific viscosity and by calculating from this specific viscosity, and can be determined according to the method of calculating the average degree of polymerization described in "JIS K6720-2".

Although the number average molecular weight of these resins is not particularly limited, the number average molecular weight is preferably 10000 to 50000 and more preferably 12000 to 42000. Moreover, the number average molecular weight can be measured by using GPC, and can be determined as a relative value in terms of polystyrene.

Surfactant

From the viewpoint of improving the wettability with a recording medium by decreasing the surface tension, a silicon-based surfactant, a fluorine-based surfactant, or a polyoxyethylene derivative which is a non-ionic surfactant may be added to the solvent-based ink composition according to the embodiment.

As the silicon-based surfactant, polyester-modified silicon or polyether-modified silicon is preferably used. Specific examples thereof include BYK-315N, 347, 348, BYK-UV3500, 3510, 3530, and 3570 (all manufactured by BYK Japan KK).

As the fluorine-based surfactant, a fluorine-modified polymer is preferably used, and a specific example thereof include BYK-340 (manufactured by BYK Japan KK).

In addition, as the polyoxyethylene derivative, an acetylene glycol-based surfactant is preferably used. Specific examples thereof include Surfynol 82, 104, 465, 485, and TG (all manufactured by Air Products and Chemicals. Inc.), Olfine STG and E1010 (both manufactured by Nissin Chemical Co., Ltd.), Nissan Nonion A-10R and A-13R (both manufactured by NOF Corporation), Floren TG-740W and D-90 (manufactured by Kyoeisha Chemical Co., Ltd.), and NOIGEN CX-100 (manufactured by Dai-ichi Kogyo Seiyaku Co., Ltd.).

The content of the surfactant in the solvent-based ink composition according to the embodiment is preferably 0.05% by mass to 3% by mass and more preferably 0.5% by mass to 2% by mass.

Other Components

The solvent-based ink composition according to the embodiment can contain a substance for imparting a predetermined performance such as a chelating agent such as an ethylenediaminetetraacetic acid salt (EDTA), a preservative, a viscosity modifier, a solubilizer, an antioxidant, and a fungicide, in addition to the above-described components.

1.2.4. Content Ratio

The content ratio of the ionic liquid to the coloring material (ionic liquid content/coloring material content) and the content ratio of the ionic liquid to the fixing resin (ionic liquid content/fixing resin content) in the solvent-based composition according to the embodiment are the same as for the aqueous ink composition described above.

1.2.5. Physical Properties

In a case where the solvent-based ink composition according to the embodiment is used as an ink for an ink jet, for example, by adjusting the composition or the combination, the viscosity (viscosity at 25° C.) is set to preferably 2 mPa·s to 20 mPa·s and more preferably 3 mPa·s to 15 mPa·s. Thus, the discharge stability (stability of discharging amount, flight characteristics of droplets, or the like) and the discharging responsiveness (a response speed, a high frequency correspondence (frequency characteristics), or the like) of the ink for an jet ink can be improved. Moreover, the viscosity of the ink for an ink jet can be determined by measurement based on JIS Z8809 using a vibration type viscometer.

The surface tension of the solvent-based ink composition according to the embodiment at a temperature of 20° C. is preferably 20 mN/m to 50 mN/m and more preferably 25 mN/m to 40 mN/m from the viewpoint of balance between the image quality and the reliability as the ink for an ink jet. Moreover, measurement of the surface tension may be performed using a Full Automatic Surface Tensiometer CBVP-Z (manufactured by Kyowa Interface Science Co., Ltd.) by verifying the surface tension when a platinum plate is wet with ink in an environment of 20° C.

1.2.6. Application

Since, when the solvent-based ink composition according to the embodiment is recorded on a film medium such as a low-absorptive recording medium, in particular, a vinyl chloride-based recording medium, the image quality is excellent, the solvent-based ink composition is suitable for sign applications which are exhibited outdoors. The vinyl chloride-based recording medium is not particularly limited as long as the vinyl chloride-based recording medium contains a vinyl chloride-based resin. Examples of the recording medium containing a vinyl chloride-based resin include a soft or hard vinyl chloride-based film or sheet. The solvent-based ink composition according to the embodiment makes it possible to record an image on an untreated surface of the vinyl chloride-based resin base, and has excellent effects that a use of an expensive recording medium as a recording medium having a receiving layer in the related art is not necessary, and it is needless to say that the solvent-based ink composition can be applied to a base surface-treated by an ink receiving layer.

1.3. Photocurable Ink Composition

The "photocurable ink composition" in the present specification refers to an ink obtained by polymerization of a polymerizable compound and by solidification thereof by irradiating the ink including the polymerizable compound with light. The photocurable ink composition according to the embodiment contains a polymerizable compound or a photopolymerization initiator, in addition to a coloring material and an ionic liquid.

1.3.1. Coloring Material

The photocurable ink composition according to the embodiment contains a pigment or a disperse dye as a coloring material. The coloring material of the same type and the same content as in the aqueous ink composition described above can be used.

1.3.2. Ionic Liquid

The photocurable ink composition according to the embodiment contains an ionic liquid. The ionic liquid of the same type and the same content as in the aqueous ink composition described above can be used. Moreover, the ionic liquid included in the photocurable ink composition according to the embodiment is preferably water-insoluble. The definition of "water-insoluble" in the invention is the same as described above.

1.3.3. Other Components

Polymerizable Compound

The polymerizable compound included in the above-described ink composition is polymerized during light radiation by the action of the photopolymerization initiator described below, and thus, the printed ink can be cured.

As the polymerizable compound, a compound having various polymerizable groups such as a monofunctional group, a difunctional group, and a tri- or higher functional group can be used. Specific examples thereof include unsaturated carboxylic acids such as (meth)acrylic acid, itaconic acid, crotonic acid, isocrotonic acid, and maleic acid, salts or esters thereof, urethanes, amides and anhydrides thereof, acrylonitrile, styrene, various unsaturated polyesters, unsaturated polyethers, unsaturated polyamides, and unsaturated urethane, an N-vinyl compound, urethane (meth)acrylate, epoxy (meth)acrylate, oxetane (meth)acrylate, and polyester (meth)acrylate.

In addition, examples of other monofunctional or multifunctional monomers may include an N-vinyl compound. Examples of the N-vinyl compound include N-vinyl formamide, N-vinyl carbazole, N-vinyl acetamide, N-vinyl pyrrolidone, N-vinyl caprolactam, acryloyl morpholine, and derivatives thereof.

The content of the polymerizable compound is preferably 1% by mass to 95% by mass and more preferably 5% by mass to 90% by mass with respect to the total mass (100% by mass) of the ink composition, form the viewpoint of excellent curability and discharge stability. As the content is smaller, the discharge stability is better, but the discharge stability also depends on the type of a polymerizable compound. Therefore, the upper limit of the content is not limited to the above range, and from the viewpoint of improvement of curability, an ink composition having a greater content of the polymerizable compound is preferable.

Photopolymerization Initiator

The photocurable ink composition according to the embodiment includes a photopolymerization initiator. The photopolymerization initiator is used so as to form an image by curing an ink present on the surface of a recording medium, by photopolymerization by irradiation with ultraviolet rays. By using ultraviolet rays (UV), safety becomes excellent and it is possible to reduce the cost of the light source lamp. The photopolymerization initiator included in the ink composition is not limited as long as it produces active species such as a radical or a cation and initiates polymerization of the polymerizable compound by light (ultraviolet rays) energy, a photoradical polymerization initiator or a photocationic polymerization initiator can be used, and between these, the photoradical polymerization initiator is preferably used.

The photoradical polymerization initiator is photocleavaged or hydrogen-drawn by irradiation with active energy rays such as ultraviolet rays, and as a result, radicals (photoradical polymerization initiator radicals) are generated, and by attacking a compound (preferably radical polymerizable (meth)acrylate) having urethane (meth)acrylate or a radical polymerizable group, photoradical polymerization is caused.

Examples of the photoradical polymerization initiator include aromatic ketones, an acylphosphine oxide compound, an aromatic onium salt compound, an organic peroxide, a thio compound (a thioxanthone compound, a thiophenyl group-containing compound, or the like), an α-aminoalkylphenone compound, a hexaarylbiimidazole compound, a ketoxime ester compound, a borate compound, an azinium compound, a metallocene compound, an active ester compound, a compound having a carbon-halogen bond, and an alkyl amine compound, but the invention is not limited thereto.

Among these, at least one of an acyl phosphineoxide compound and a thioxanthone compound is preferable, and a combination of an acylphosphineoxide compound and a thioxanthone compound are more preferable since the curability of an ink can be further improved.

Specific examples of the photoradical polymerization initiator include acetophenone, 2,2-diethoxyacetophenone, p-dimethyl aminoacetophenone, benzophenone, 2-chlorobenzophenone, p,p'-dichlorobenzophenone, p,p'-bisdiethyl aminobenzophenone, Michler's ketone, benzyl, benzoin, benzoin methyl ether, benzoin ethyl ether, benzoin isopropyl ether, benzoin-n-propyl ether, benzoin isobutyl ether, benzoin-n-butyl ether, benzyl methyl ketal, 2,2-dimethoxy-1,2-diphenylethan-1-one, 1-hydroxycyclohexyl phenyl ketone, 2-hydroxy-1-{4-[4-(2-hydroxy-2-methylpropionyl)benzyl]phenyl} 2-methylpropan-1-one, 2-benzyl-2-dimethylamino-1-(4-morpholinophenyl) butanone-1, 2-dimethylamino-2-(4-methylbenzyl)-1-(4-morpholin-4-yl phenyl) butan-1-one, 2,4,6-trimethylbenzoyl diphenyl phosphine oxide, bis(2,4,6-trimethylbenzoyl)phenyl phosphine oxide, bis(2,6-dimethoxybenzoyl)-2,4,4-trimethyl pentyl phosphine oxide, 2-methyl-1-[4-(methylthio)phenyl] 2-morpholinopropan-1-one, thioxanthone, 2-chlorothioxanthone, 2-methyl thioxanthone, 2-isopropyl thioxanthone, 4-isopropyl thioxanthone, 2-hydroxy-2-methyl-1-phenyl-1-one, 1-(4-isopropylphenyl)-2-hydroxy-2-methylpropan-1-one, methylbenzoyl formate, azobisisobutyronitrile, benzoyl peroxide, and di-tert-butyl peroxide, but the invention is not limited thereto.

Examples of commercially available products of the photoradical polymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl) phenyl]-1-butanone), DAROCUR TPO (2,4,6-trimethylbenzoyl-diphenyl-phosphineoxide), IRGACURE 819 (bis(2,4,6-trimethylbenzoyl)-phenylphosphineoxide), IRGACURE 784 (bis(η5-2,4-cylcopentadien-1-yl)-bis(2,6-difluoro-3-(1H-pyrrol-1-yl)-phenyl) titanium), IRGACURE OXE 01 (1,2-octanedione, 1-[4-(phenylthio)-,2-(O-benzoyloxime)]), IRGACURE OXE 02 (ethanone, 1-[9-ethyl-6-(2-methylbenzoyl)-9H-carbazol-3-yl]-1-(O-acetyloxime)), and IRGACURE 754 (a mixture of oxyphenyl acetic acid and 2-[2-oxo-2-phenylacetoxyethoxy]ethyl ester and oxyphenyl acetic acid and 2-(2-hydroxyethoxy)ethyl ester) (hereinbefore, manufactured by BASF Corp.), Speedcure TPO, Speedcure DETX (2,4-diethylthioxanthone), Speedcure ITX (2-isopropylthioxanthone) (hereinbefore, manufactured by Lambson Limited), KAYACURE DETX-S (2,4-diethylthioxanthone) (manufactured by Nippon Kayaku Co., Ltd.), Lucirin TPO, LR8893, and LR8970 (hereinbefore, manufactured by BASF Corp.), and Ubecryl P36 (UCB Chemicals).

The above photopolymerization initiators may be used alone or in combination of two or more types thereof.

The content of the photopolymerization initiator is preferably 0.1% by mass to 15% by mass and more preferably 0.5% by mass to 10% by mass with respect to total mass (100% by mass) of the ink. When the content is within the above range, it is possible to sufficiently exert an ultraviolet-curing speed and avoid leaving undissolved residues of the photopolymerization initiator and coloring due to the photopolymerization initiator.

Other Components

The photocurable ink composition according to the embodiment can contain a slipping agent (surfactant), a polymerization inhibitor, a polymerization accelerator, a penetration enhancer, a solvent, a wetting agent (humectant), and other additives, in addition to the above-described components. Examples of the other additives described above include a fixing agent, an antifungal agent, a preservative, an antioxidant, an ultraviolet absorber, a chelating agent, and a thickener known in the related art.

1.3.4. Content Ratio

The content ratio of the ionic liquid to the coloring material (ionic liquid content/coloring material content) and the content ratio of the ionic liquid to the fixing resin (ionic liquid content/fixing resin content) in the photocurable ink composition according to the embodiment are the same as for the aqueous ink composition described above.

1.3.5. Physical Properties

When the photocurable ink composition according to the embodiment is discharged from the nozzles of an ink jet head, the viscosity of the ink composition at 20° C. is preferably equal to or less than 35 mPa·s and more preferably equal to or less than 25 mPa·s to improve the discharge stability.

In addition, since the photocurable ink composition according to the embodiment has a viscosity greater than that of an aqueous ink composition used in a typical ink for an ink jet, changes in viscosity due to temperature changes at the time of discharging are great. The changes in viscosity of an ink are greatly influenced by changes in the droplet size and changes in the droplet discharging speed, and can lead to deterioration of the image quality. Therefore, it is preferable to keep the temperature of the ink at the time of discharging constant as much as possible.

2. EXAMPLES

Hereinafter, the invention will be more specifically described based on Examples, but the invention is not limited thereto. Moreover, "parts" and "%" in Examples and Comparative Examples are based on mass unless specified otherwise.

2.1. Preparation and Evaluation of Aqueous Ink Composition 2.1.1 Preparation of Aqueous Ink Composition The aqueous ink compositions shown in Table 1 were prepared in the following manner. Respective materials shown in Table 1 were mixed in the content (unit: % by mass) shown in Table 1, followed by sufficiently stirring. After this mixed liquid was filtered using a metal filter having a pore size of 5 μm, the resultant product was subjected to a deaeration treatment using a vacuum pump, whereby respective aqueous ink compositions to be used in Examples and Comparative Examples were obtained.

TABLE 1

|  |  |  | Examples |  |  |  |  |  |  | Comparative Examples |  |  |  |
|---|---|---|---|---|---|---|---|---|---|---|---|---|---|
|  |  |  | 1 | 2 | 3 | 4 | 5 | 6 | 7 | 1 | 2 | 3 | 4 |
| Ink composition | Pigment | Yellow pigment dispersion (solid content concentration: 20%) | 25 | 25 | 25 | 25 | — | — | — | 25 | 25 | 25 | — |
|  |  | Cyan pigment dispersion (solid content concentration: 20%) | — | — | — | — | 25 | 25 | 25 | — | — | — | 25 |
|  | Fixing resin | Urethane resin A (Tg = −31° C.) | 5 | 5 | 5 | 5 | — | — | — | 5 | 5 | 5 | — |
|  |  | Urethane resin B (Tg = −20° C.) | — | — | — | — | 1 | 1 | 1 | — | — | — | 1 |
|  | Organic solvent | Glycerin | 7.5 | 7.5 | 7.5 | 7.5 | 6 | 6 | 6 | 7.5 | 7.5 | 7.5 | 6 |
|  |  | Triethylene glycol | 1 | 1 | 1 | 1 | 1 | 1 | 1 | 1 | 1 | 1 | 1 |
|  |  | Triethylene glycol monobutyl ether | 2 | 2 | 2 | 2 | 2 | 2 | 2 | 2 | 2 | 2 | 2 |
|  |  | 2-Pyrrolidone | 4 | 4 | 4 | 4 | 4 | 4 | 4 | 4 | 4 | 4 | 4 |
|  | Surfactant | BYK-348 | 0.3 | 0.3 | 0.3 | 0.3 | 0.3 | 0.3 | 0.3 | 0.3 | 0.3 | 0.3 | 0.3 |
|  | Ionic liquid | EMI · Cl | 0.05 | 2.5 | 5 | 1 | 3 | 5 | 1 | — | 0.015 | 5 | 3 |
|  |  | BMI · Cl | — | — | — | 1 | — | — | 1 | — | 0.01 | 5 | 3 |
|  |  | Ion exchange water | Balance | Balance | Balance | Balance | Balance | Balance | Balance | Balance | Balance | Balance | Balance |
|  |  | Amount of ionic liquid added | 0.05 | 2.5 | 5 | 2 | 3 | 5 | 2 | — | 0.025 | 10 | 6 |
|  |  | Ionic liquid/pigment content ratio | 0.01 | 0.5 | 1 | 0.4 | 0.6 | 1 | 0.4 | — | 0.005 | 2 | 1.2 |
|  |  | Ionic liquid/fixing resin content ratio | 0.01 | 0.5 | 1 | 0.4 | 3 | 5 | 2 | — | 0.005 | 2 | 6 |
| Ink evaluation |  | Impurities | Not present | Not present | Not present | Not present | Not present | Not present | Not present | Present | Present | Not present | Not present |
|  |  | Preservation stability | B | A | A | A | B | A | A | D | C | A | A |
|  |  | Clogging recoverability after being left to stand | B | B | A | A | B | A | A | D | C | A | A |
|  |  | Discharge stability | B | A | A | A | B | A | A | D | C | A | A |
|  |  | Print quality (bleeding) | A | A | A | A | A | A | A | A | A | D | D |

Moreover, the aqueous ink compositions shown in Table 2 were prepared in the following manner. First, a mixture consisting of C. I. Disperse Red 60 (DR60) as a disperse dye, a lignin sulfonic acid sodium formalin condensate (manufactured by Nippon Paper Chemicals Co., Ltd., trade name "Pearl Rex DP") as an anionic surfactant, and ion exchange water was subjected to a dispersion treatment for 15 hours under cooling using a sand mill with glass beads having a diameter of 0.2 mm. After the dispersion treatment, the resultant product was diluted with ion exchange water, and then, the dispersion was filtered using a glass fiber filter GC-50 (manufactured by Toyo Roshi Kaisha, Ltd., a filter pore size of 0.5 μm) to remove components having a large particle size, whereby an aqueous dispersion was obtained. Next, the aqueous dispersion obtained in the above manner and the materials shown in Table 2 were mixed in a predetermined proportion, whereby respective aqueous ink compositions to be used in Examples and Comparative Examples were obtained.

(1) Evaluation of Impurities

After the printer filled with the aqueous ink composition was allowed to stand at 40° C. for 3 months, the head was removed from the printer, and by visually observing the nozzle tip, the presence or absence of contaminations was checked.

(2) Evaluation of Preservation Stability

After 40 g of each of the aqueous ink compositions was put into each of glass bottles having a volume of 50 cc, these bottles were sealed, put into a thermostat at 60° C., and allowed to stand for seven days. After seven days, the ink compositions were taken out from the bottles, then, the temperature was returned to room temperature, and the viscosity at 25° C. was measured using a DVM-E type rotational viscometer (manufactured by Tokyo Keiki Inc.). The rate of changes in viscosity after allowing to stand for seven days with respect to the initial viscosity measured in advance was calculated. The evaluation criteria are as follows.

TABLE 2

|  |  |  | Examples | | | Comparative |
|---|---|---|---|---|---|---|
|  |  |  | 8 | 9 | 10 | Example 5 |
| Ink composition | Disperse dye | DR160 | 8 | 8 | 8 | 8 |
|  | Dispersant | Pearl Rex DP | 8 | 8 | 8 | 8 |
|  | Organic solvent | Triethylene glycol monobutyl ether | 4 | 4 | 4 | 4 |
|  |  | Glycerin | 15 | 15 | 15 | 15 |
|  | pH adjusting agent | Triethanolamine | 0.5 | 0.5 | 0.5 | 0.5 |
|  | Ionic liquid | EMI · Cl | 2 | 4 | 1 | — |
|  |  | BMI · Cl | — | — | 1 | — |
|  |  | Ion exchange water | Balance | Balance | Balance | Balance |
|  |  | Amount of ionic liquid added | 2 | 4 | 2 | — |
|  |  | Ionic liquid/disperse dye content ratio | 0.25 | 0.5 | 0.25 | — |
| Ink evaluation |  | Impurities | Not present | Not present | Not present | Present |
|  |  | Preservation stability | B | A | A | D |
|  |  | Clogging recoverability after being left to stand | B | A | A | D |
|  |  | Discharge stability | B | A | A | D |

Moreover, abbreviations for respective components used in Table 1 and 2 are as follows.

Fixing Resin

Urethane resin A (trade name "Superflex 470", manufactured by Dai-ichi Kogyo Seiyaku Co., Ltd., Tg=−31° C.)

Urethane resin B (trade name "Superflex 420", manufactured by Dai-ichi Kogyo Seiyaku Co., Ltd., Tg=−20° C.) Surfactant BYK-348 (manufactured by BYK Japan KK, a silicon-based surfactant)

Ionic Liquid

EMI.Cl (1-Ethyl-3-Methylimidazolium Chloride, solid (melting point of 78° C., manufactured by Wako Pure Chemical Industries, Ltd.)

BMI.Cl (1-Butyl-3-Methylimidazolium Chloride, solid (melting point of 67° C., manufactured by Wako Pure Chemical Industries, Ltd.) 2.1.2. Evaluation Method of Aqueous Ink Composition An ink jet printer PX-G930 (manufactured by Seiko Epson Corporation) was initially filled with each of the aqueous ink compositions shown in Tables 1 and 2, and the following evaluations were performed.

Evaluation Criteria

A: the rate of changes in viscosity was less than ±3%

B: the rate of changes in viscosity was equal to or greater than ±3% and less than ±5%.

C: the rate of changes in viscosity was equal to or greater than ±5% and less than ±10%.

D: the rate of changes in viscosity was equal to or greater than ±10%.

(3) Evaluation of Clogging Recoverability after being Left to Stand

A dedicated cartridge of an ink jet printer was filled with each of the aqueous ink compositions. The cartridge was mounted on an ink jet printer PX-G930 (manufactured by Seiko Epson Corporation), and by continuously performing printing for 10 minutes, it was confirmed that the ink was normally discharged from all of the nozzles. Next, the ink cartridge was taken out, and in the state of removing the head cap, the recording head was allowed to stand for three months in an environment of 50° C. After being allowed to stand, cleaning operation was repeated until all of the nozzles discharged equivalently to the initial discharge, and the recoverability was evaluated according to the following criteria.

Evaluation Criteria

A: it was possible to print equivalently to the initial printing by equal to or less than two times head cleaning.

B: it was possible to print equivalently to the initial printing by three or four times head cleaning.

C: it was possible to print equivalently to the initial printing by five to ten times head cleaning.

D: it was not possible to print equivalently to the initial printing by equal to or less than ten times head cleaning.

(4) Evaluation of Discharge Stability

A dedicated cartridge of an ink jet printer was filled with each of the aqueous ink compositions. The cartridge was mounted on an ink jet printer PX-G930 (manufactured by Seiko Epson Corporation), and under an atmosphere of 35° C. and humidity of RH 35%, Microsoft Word text (font size of 11, standard, MSP Gothic) was printed on 500 pages of Xerox P (trade name, Fuji Xerox Co., Ltd.) with an A4 size at a proportion of 4000 characters/page. Evaluation of discharge stability was performed on the text of the 500th page according to the following evaluation criteria.

Evaluation Criteria

A: there were no printing irregularities.

B: there were printing irregularities at one to three places.

C: there were printing irregularities at three to nine places.

D: there were printing irregularities at ten or more places.

2.2. Preparation and Evaluation of Solvent-Based Ink Composition 2.2.1 Preparation of Solvent-based Ink Composition The solvent-based ink compositions shown in Table 3 were prepared in the following manner. First, the organic solvents were put into a container in the content (unit: % by mass) shown in Table 3, followed by stirring for 30 minutes using a stirrer. Next, a predetermined amount of Solsperse 37500 (manufactured by LUBRIZOL Corp., dispersant) and a cyan pigment (manufactured by Clariant Co., Ltd., C. I. Pigment Blue 15:3) was added to a part of the obtained mixed solvent, and the resultant product was subjected to a pulverization treatment using a homogenizer. Thereafter, a dispersion treatment was performed using a bead mill filled with zirconia beads having a diameter of 0.3 mm, whereby a pigment dispersion was obtained. A predetermined amount of the remainder of the organic solvent and the materials described in Table 3 was added to the obtained pigment dispersion, then, the resultant product was mixed and stirred for one hour, and filtered using a PTFE membrane filter having a pore size of 5 μm, whereby respective solvent-based ink compositions to be used in Examples and Comparative Examples were obtained.

TABLE 3

|  |  |  | Examples | | Comparative Example |
|---|---|---|---|---|---|
|  |  |  | 11 | 12 | 6 |
| Ink composition | Pigment | PB15:3 | 6 | 6 | 6 |
|  | Dispersant | Solsperse 37500 | 4 | 4 | 4 |
|  | Surfactant | BYK-315 | 0.1 | 0.1 | 0.1 |
|  | Fixing resin | PARALOID B60 | 1.5 | 1.5 | 1.5 |
|  |  | Vinyl chloride-vinyl acetate copolymer resin | 1 | 1 | 1 |
|  | Ionic liquid | AEIm TFSI | 3 | 2.5 | — |
|  |  | AAIm TFSI | — | 0.5 | — |
|  | Organic solvent | γ-butyrolactone | 10 | 10 | 10 |
|  |  | Equamide M100 | 5 | 5 | 5 |
|  |  | Diethylene glycol ethyl methyl ether | 20 | 20 | 20 |
|  |  | Diethylene glycol diethyl ether | Balance | Balance | Balance |
|  |  | Amount of ionic liquid added | 3 | 3 | — |
|  |  | Ionic liquid/pigment content ratio | 0.5 | 0.5 | — |
|  |  | Ionic liquid/fixing resin content ratio | 1.2 | 1.2 | — |
| Ink evaluation |  | Impurities | Not present | Not present | Not present |
|  |  | Preservation stability | B | A | D |
|  |  | Discharge stability | B | A | D |

(5) Evaluation of Print Quality (bleeding)

A dedicated cartridge of an ink jet printer was filled with each of the aqueous ink compositions shown in Table 1. The cartridge was mounted on an ink jet printer PX-G930 (manufactured by Seiko Epson Corporation), and printing was performed on Xerox P paper (trade name, Fuji Xerox Co., Ltd.) with an A4 size in a predetermined printing pattern. Thereafter, the presence or absence of bleeding in the pattern of the obtained printed material was observed using an optical microscope, and evaluation was performed according to the following criteria.

Evaluation Criteria

A: there was no bleeding in the printed pattern.

B: there was bleeding at one to three places in the printed pattern.

C: there was bleeding at four to nine places in the printed pattern.

D: there was bleeding at ten or more places in the printed pattern.

Moreover, abbreviations for respective components shown in Table 3 are as follows.

Surfactant

BYK-315 (manufactured by BYK Japan KK, a silicon-based surfactant)

Fixing Resin

Vinyl chloride-vinyl acetate copolymer resin (manufactured by Nissin Chemical Co., Ltd., trade name "SOLBIN CL")

PARALOID B60 (manufactured by Rohm & Haas Company, acrylic resin)

Organic Solvent

Equamide M100 (manufactured by Idemitsu Kosan Co., Ltd., a vinyl chloride swelling agent)

Ionic Liquid

AEIm TFSI ((1-Allyl-3-ethylimidazolium bis(trifluoromethanesulfonyl) imide, liquid, Kanto Chemical Co., Inc.)

AAIm TFSI
((1,3-Diallylimidazolium bis(trifluoromethanesulfonyl) imide, liquid, Kanto Chemical Co., Inc.)

2.2.2. Evaluation Method of Solvent-Based Ink Composition

An ink jet printer was initially filled with each of the solvent-based ink compositions shown in Table 3, and the following evaluations were performed.

(1) Evaluation of Impurities

The presence or absence of impurities was checked by the same method as that in the aqueous ink composition except that an ink jet printer SP-300V (manufactured by Roland DG Corporation) was used.

(2) Evaluation of Preservation Stability

The evaluation of preservation stability of the solvent-based ink compositions was performed by the same method as that in the aqueous ink composition.

(3) Evaluation of Discharge Stability

A dedicated cartridge of an ink jet printer was filled with each of the solvent-based ink compositions. The cartridge was mounted on an ink jet printer SP-300V (manufactured by Roland DG Corporation), and printing of a specific pattern was continuously performed for 10 hours. At this time, a heater setting temperature at the time of printing was 50° C., and printing was performed on a glossy polyvinyl chloride sheet SV-G-1270G (manufactured by Roland DG Corporation) under the conditions of Duty 200%. After 10 hours, evaluation of discharge stability was performed on the printed specific pattern according to the following evaluation criteria.

Evaluation Criteria
A: there were no irregularities in the printed pattern.
B: there were irregularities at one to three places in the printed pattern.
C: there were irregularities at four to nine places in the printed pattern.
D: there were irregularities at ten or more places in the printed pattern.

Moreover, the "Duty value" in the present specification is a value calculated by the following equation.

Duty (%)=the number of actually discharged dots/ (vertical resolution×horizontal resolution)×100

(In the equation, "the number of actually discharged dots" is the number of actual dots per unit area, and the "vertical resolution" and the "horizontal resolution" are the resolution per unit area, respectively.)

2.3. Preparation and Evaluation of Photocurable Ink Composition 2.3.1 Preparation of Photocurable Ink Composition Respective materials shown in Table 4 were sufficiently mixed and stirred in the content shown in Table 4, and the resultant product was deaerated using a vacuum pump, whereby each photocurable ink composition was obtained.

TABLE 4

|  |  |  | Examples | | Comparative Example |
|---|---|---|---|---|---|
|  |  |  | 13 | 14 | 7 |
| Ink composition | Pigment | PV19 | 5 | 5 | 5 |
|  | Polymerizable compound | VEEA | 50 | 50 | 50 |
|  |  | PEA | 10 | 10 | 10 |
|  |  | DPGDA | 21.6 | 21.6 | 24.6 |
|  | Photopolymerization initiator | IRGACURE 819 | 4 | 4 | 4 |
|  |  | DAROCURE TPO | 4 | 4 | 4 |
|  |  | Speedcure DETX | 2 | 2 | 2 |
|  | Polymerization inhibitor | MEHQ | 0.2 | 0.2 | 0.2 |
|  | Surfactant | UV3500 | 0.2 | 0.2 | 0.2 |
|  | Ionic liquid | AEIm TFSI | 3 | 2.5 | — |
|  |  | AAIm TFSI | — | 0.5 | — |
|  | Amount of ionic liquid added |  | 3 | 3 | — |
|  | Ionic liquid/pigment content ratio |  | 0.6 | 0.6 | — |
| Ink evaluation | Impurities |  | Not present | Not present | Not present |
|  | Preservation stability |  | B | A | D |
|  | Discharge stability |  | B | A | D |

Moreover, abbreviations for respective components shown in Table 4 are as follows.

Coloring Material
  PV19 (C. I. Pigment Violet 19)
Radical Polymerizable Compound
  VEEA (2-(2-vinyloxyethoxy)ethyl acrylate, manufactured by Nippon Shokubai Co., Ltd.)
  PEA (phenoxyethyl acrylate, manufactured by Osaka Organic Chemical Industry Ltd.)
  DPGDA (dipropylene glycol diacrylate, manufactured by Sartomer Co., Ltd.)
Photopolymerization Initiator
  IRGACURE 819 (trade name, manufactured by BASF Corp., 100% of solid content)
  DAROCURE TPO (trade name, manufactured by BASF Corp., 100% of solid content)
  Speedcure DETX (trade name, manufactured by Lambson Limited, 100% of solid content)
Polymerization Inhibitor
  MEHQ (p-methoxyphenol)
Silicon-Based Surfactant
  UV3500 (manufactured by BYK Japan KK)
Ionic Liquid
  AEIm TFSI
  ((1-Allyl-3-ethylimidazolium bis(trifluoromethanesulfonyl) imide, liquid, Kanto Chemical Co., Inc.)
  AAIm TFSI
  ((1,3-Diallylimidazolium bis(trifluoromethanesulfonyl) imide, liquid, Kanto Chemical Co., Inc.)

2.3.2 Preparation of Photocurable Ink Composition

An ink jet printer was initially filled with each of the photocurable ink compositions shown in Table 4, and the following evaluations were performed.

(1) Evaluation of Impurities

The presence or absence of impurities was checked by the same method as that in the aqueous ink composition.

(2) Evaluation of Preservation Stability

The evaluation of preservation stability was performed by the same method as that in the aqueous ink composition.

(3) Evaluation of Discharge Stability

The evaluation of discharge stability was performed by the same method as that in the aqueous ink composition except that a PET film (PET 50A PL Shin, manufactured by Lintec Corporation) was used as a recording medium. Moreover, after the photocurable ink composition was sufficiently cured by sufficiently irradiating the 500th PET film with ultraviolet rays (irradiation was performed at an intensity of 800 mW/cm$^2$ and a peak wavelength of 395 nm), evaluation was performed.

2.4. Evaluation Results

As apparent from the results shown in Tables 1 to 4, according to the ink compositions for ink jet of Examples 1 to 14, it was found that the generation of impurities in the ink can be suppressed by containing a predetermined amount of ionic liquid even in any case of an aqueous ink, a solvent-based ink, and a photocurable ink. As a result, it was found that the preservation stability or the discharge stability of the ink is improved.

In addition, it was found that by plural types of ionic liquids being blended in the ink, better results are obtained than a case where one type of ionic liquid is blended in the ink. It is thought that this is because a wider range of contaminations in a structure or solubility is easily dissolved by increase in the types of blended ionic liquids.

The invention is not limited to the above-described embodiments and various modifications are possible. For example, the invention includes substantially the same configuration (for example, a configuration in which functions, methods, and results are the same or a configuration in which the purposes or effects are the same) as the configuration described in the embodiments. Further, the invention includes a configuration in which a part which is not substantial in the configuration described in the embodiments is replaced. In addition, the invention includes configurations exhibiting the same action effects as the configurations described in the embodiments or configurations capable of achieving the same object. In addition, the invention includes a configuration made by adding a known technology to the configuration described in the embodiments.

This application claims priority to Japanese Patent Application Nos. 2015-099998 filed on May 15, 2015 and 2015-165551 filed on Aug. 25, 2015. The entire disclosures of Japanese Patent Application Nos. 2015-099998 and 2015-165551 are hereby incorporated herein by reference.

What is claimed is:

1. An ink composition for an ink jet, comprising:
   a pigment or a disperse dye as a coloring material;
   an ionic liquid; and
   a polymerizable compound,
   wherein the content of the ionic liquid is 0.05% by mass to 5% by mass.

2. The ink composition for an ink jet according to claim 1,
   wherein the ionic liquid is a liquid ionic compound at a temperature lower than 150° C.

3. The ink composition for an ink jet according to claim 1,
   wherein the content ratio of the ionic liquid to the coloring material (ionic liquid content/coloring material content) is in the range of 0.01 to 1.

4. The ink composition for an ink jet according to claim 1, further comprising:
   a resin having a glass transition temperature of 0° C. or lower.

5. The ink composition for an ink jet according to claim 4,
   wherein the content ratio of the ionic liquid to the resin (ionic liquid content/resin content) is in the range of 0.01 to 5.

6. The ink composition for an ink jet according to claim 1, further comprising as the ionic liquid:
   two or more types of ionic liquids.

7. The ink composition for an ink jet according to claim 1, further comprising water as a solvent.

8. The ink composition for an ink jet according to claim 1, comprising:
   wherein the ionic liquid is water-soluble.

9. The ink composition for an ink jet according to claim 1,
   wherein the ionic liquid is water-insoluble.

* * * * *